United States Patent
Fakoorian et al.

(10) Patent No.: US 10,491,279 B2
(45) Date of Patent: Nov. 26, 2019

(54) PRECODED SOUNDING REFERENCE SIGNAL TRANSMISSION WITH ASYMMETRIC TRANSMIT AND RECEIVE ANTENNAS

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/955,408

(22) Filed: Apr. 17, 2018

(65) Prior Publication Data

US 2018/0337716 A1 Nov. 22, 2018

Related U.S. Application Data

(60) Provisional application No. 62/507,376, filed on May 17, 2017.

(51) Int. Cl.
*H04L 5/12* (2006.01)
*H04B 7/0456* (2017.01)
(Continued)

(52) U.S. Cl.
CPC ......... *H04B 7/0486* (2013.01); *H04B 7/0404* (2013.01); *H04B 7/0456* (2013.01);
(Continued)

(58) Field of Classification Search
CPC ..... H04L 1/0054; H04L 1/005; H04L 5/0048; H04L 1/00; H04L 1/0053; H04L 1/0009;
(Continued)

(56) References Cited

U.S. PATENT DOCUMENTS

| 9,596,065 | B2 | 3/2017 | Chen et al. | |
| 2009/0054093 | A1* | 2/2009 | Kim | H04B 7/061 |
| | | | | 455/500 |
| 2018/0097595 | A1* | 4/2018 | Huang | H04L 1/0009 |

FOREIGN PATENT DOCUMENTS

| WO | WO-2014065850 | 5/2014 |
| WO | WO-2014172515 A1 | 10/2014 |

OTHER PUBLICATIONS

Qualcomm Incorporated: "CSI Acquisition for Reciprocity Based Operation," 3GPP Draft; R1-1702612, 3rd Generation Partnership Project (3GPP), Mobile Competence Centre; 650, Route Des Lucioles; F-06921 Sophia-Antipolis Cedex; France, vol. Ran WG1, no. Athens, Greece; Feb. 13, 2017-Feb. 17, 2017, Feb. 12, 2017, XP051209765, 5 pages, Retrieved from the Internet: URL: http://www.3gpp.org/ftp/Meetings_3GPP_SYNC/RAN1/Docs/ [retrieved on Feb. 12, 2017].

(Continued)

*Primary Examiner* — Khai Tran
(74) *Attorney, Agent, or Firm* — Liem T. Do

(57) ABSTRACT

Methods, systems, and devices for wireless communication are described. A user equipment (UE) may obtain an interference and noise covariance matrix for a plurality of antennas of the UE. The UE may generate an approximated covariance matrix based on the inference and noise covariance matrix and a number of the antennas of the plurality of antennas associated with transmit operations at the UE. The number of the antennas associated with transmit operations at the UE may be fewer than a total number of the antennas. The UE may precode a sounding reference signal (SRS) using the approximated covariance matrix, and transmit the precoded SRS using the antennas associated with the transmit operations.

30 Claims, 14 Drawing Sheets

(51) Int. Cl.
*H04B 7/0404* (2017.01)
*H04B 7/06* (2006.01)
H04W 72/04 (2009.01)
H04B 17/345 (2015.01)
H04L 25/02 (2006.01)

(52) U.S. Cl.
CPC ......... *H04B 7/0691* (2013.01); *H04B 17/345* (2015.01); *H04L 25/0224* (2013.01); *H04W 72/0413* (2013.01)

(58) Field of Classification Search
CPC .... H04L 1/1671; H04W 88/02; H04W 88/08; H04W 72/00; H04W 72/0446; H03M 13/41
USPC ......... 375/262, 260, 267; 370/329, 252, 336
See application file for complete search history.

(56) References Cited

OTHER PUBLICATIONS

Qualcomm Incorporated: "CSI Acquisition for Reciprocity Based Operation," 3GPP Draft; R1-1708591, 3rd Generation Partnership Project (3GPP), Mobile Competence Centre; 650, Route Des Lucioles; F-06921 Sophia-Antipolis Cedex; France vol. RAN WG1, no. Hangzhou, China; May 15, 2017-May 19, 2017, May 7, 2017 (May 7, 2017), XP051263230, URL:http:ffwww.3gpp.org/ftp/tsg ran/WG1 RL1/TSGR1 89/Docs/, pp. 1-5.
International Search Report and Written Opinion—PCT/US2018/028131—ISA/EPO—dated Jul. 19, 2018.

\* cited by examiner

PRECODED SOUNDING REFERENCE SIGNAL TRANSMISSION WITH ASYMMETRIC TRANSMIT AND RECEIVE ANTENNAS

CROSS REFERENCES

The present application for patent claims priority to U.S. Provisional Patent Application No. 62/507,376 by FAKOORIAN, et al., entitled "PRECODED SOUNDING REFERENCE SIGNAL TRANSMISSION WITH ASYMMETRIC TRANSMIT AND RECEIVE ANTENNAS," filed May 17, 2017, assigned to the assignee hereof.

BACKGROUND

The following relates generally to wireless communication, and more specifically to precoded sounding reference signal (SRS) transmission with asymmetric transmit and receive antennas.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station may configure a UE to transmit a SRS in a subframe or periodically in multiple subframes. The base station may receive the SRS transmissions and evaluate a channel quality of an uplink (UL) path to support UL grants.

SUMMARY

A user equipment (UE) may establish a connection with a base station. In some cases, the UE may perform interference and noise covariance measurement at a number of antennas associated with operations at the UE. The UE may use the covariance measurements to precode sounding reference signal (SRS) transmissions. The UE may transmit the precoded SRS transmissions to the base station. When SRS transmissions are precoded with the covariance measurements, separate transmission of the covariance measurements to the base station may be unnecessary. Nevertheless, in some cases, a UE may be configured to use fewer antennas during transmit operations than receive operations. As such, a covariance matrix corresponding to receive antennas may have a higher dimension than the UE is capable of using to precode SRS transmissions.

The present disclosure provides techniques for precoding SRS transmissions with interference and noise covariance information for UEs configured to use fewer transmit antennas than receive antennas. In some cases, a UE may approximate a full interference and covariance matrix as a block diagonal matrix and precode separate SRS transmissions using different portions of the approximated covariance matrix. Alternatively, a UE may use different antenna groups to precode SRS transmissions using different portions of the full interference and noise covariance matrix. Precoding SRS transmissions with interference and noise covariance information for UEs in this way may support enhanced coexistence, higher data rate, capacity, and spectral efficiency in wireless systems.

A method for wireless communication is described. The method may include obtaining an interference and noise covariance matrix for a plurality of antennas of a UE, the plurality of antennas containing a first antenna group and a second antenna group, where the first antenna group and the second antenna group are configured to transmit at different times, determining a plurality of precoders for each antenna group based at least in part on a partitioning of the covariance matrix, precoding a SRS for each antenna group using the determined plurality of precoders, and performing a separate SRS transmission for each determined precoder of each antenna group based at least in part on the precoding.

An apparatus for wireless communication is described. The apparatus may include means for obtaining an interference and noise covariance matrix for a plurality of antennas of a UE, the plurality of antennas containing a first antenna group and a second antenna group, where the first antenna group and the second antenna group are configured to transmit at different times, means for determining a plurality of precoders for each antenna group based at least in part on a partitioning of the covariance matrix, means for precoding a SRS for each antenna group using the determined plurality of precoders, and means for performing a separate SRS transmission for each determined precoder of each antenna group based at least in part on the precoding.

Another apparatus for wireless communication is described. The apparatus may include a processor, memory in electronic communication with the processor, and instructions stored in the memory. The instructions executable by the processor to obtain an interference and noise covariance matrix for a plurality of antennas of a UE, the plurality of antennas containing a first antenna group and a second antenna group, where the first antenna group and the second antenna group are configured to transmit at different times, determine a plurality of precoders for each antenna group based at least in part on a partitioning of the covariance matrix, precode a SRS for each antenna group using the determined plurality of precoders, and perform a separate SRS transmission for each determined precoder of each antenna group based at least in part on the precoding.

A non-transitory computer-readable medium storing code for wireless communication is described, the code containing instructions executable to obtain an interference and noise covariance matrix for a plurality of antennas of a UE, the plurality of antennas containing a first antenna group and a second antenna group, where the first antenna group and the second antenna group are configured to transmit at different times, determine a plurality of precoders for each antenna group based at least in part on a partitioning of the covariance matrix, precode a SRS for each antenna group using the determined plurality of precoders, and perform a separate SRS transmission for each determined precoder of each antenna group based at least in part on the precoding.

Some examples of the method, apparatus, and non-transitory computer-readable medium described above may further include processes, features, means, or instructions for performing a separate SRS transmission for each determined precoder of each antenna group over different tones or at different times. Some examples of the method, apparatus, and non-transitory computer-readable medium described above may further include processes, features, means, or instructions for transmitting a message to a base station containing an indication of a transmission timing of the separate SRS transmissions for each determined precoder of each antenna group.

In some examples of the method, apparatus, and non-transitory computer-readable medium described above, the message may comprise a RRC configuration message. Some examples of the method, apparatus, and non-transitory computer-readable medium described above may further include processes, features, means, or instructions for performing SRS transmissions associated with one of the antenna groups on even SRS tones, and performing SRS transmissions associated with the other of the antenna groups on odd SRS tones.

Some examples of the method, apparatus, and non-transitory computer-readable medium described above may further include processes, features, means, or instructions for performing SRS transmissions associated with the one of the antenna groups on a first SRS symbol, and performing SRS transmissions associated with the other of the antenna groups on a second SRS symbol. In some examples of the method, apparatus, and non-transitory computer-readable medium described above, the first SRS symbol and the second SRS symbol are adjacent.

Another method for wireless communication is described. The method may include obtaining an interference and noise covariance matrix for a plurality of antennas of a UE, generating an approximated covariance matrix based at least in part on the covariance matrix and a number of the antennas of the plurality of antennas associated with transmit operations at the UE, where the number of the antennas associated with transmit operations at the UE is fewer than a total number of the antennas; precoding a sounding reference signal (SRS) using the approximated covariance matrix, and transmitting the precoded SRS using the antennas associated with transmit operations.

Another apparatus for wireless communication is described. The apparatus may include means for obtaining an interference and noise covariance matrix for a plurality of antennas of a UE, means for generating an approximated covariance matrix based at least in part on the covariance matrix and a number of the antennas of the plurality of antennas associated with transmit operations at the UE, where the number of the antennas associated with transmit operations at the UE is fewer than a total number of the antennas, means for precoding a SRS using the approximated covariance matrix, and means for transmitting the precoded SRS using the antennas associated with transmit operations.

Another apparatus for wireless communication is described. The apparatus may include a processor, memory in electronic communication with the processor, and instructions stored in the memory. The instructions executable by the processor to obtain an interference and noise covariance matrix for a plurality of antennas of a UE, generate an approximated covariance matrix based at least in part on the covariance matrix and a number of the antennas of the plurality of antennas associated with transmit operations at the UE, where the number of the antennas associated with transmit operations at the UE is fewer than a total number of the antennas, precode a SRS using the approximated covariance matrix, and transmit the precoded SRS using the antennas associated with transmit operations.

A non-transitory computer-readable medium storing code for wireless communication is described, the code containing instructions executable to obtain an interference and noise covariance matrix for a plurality of antennas of a UE, generate an approximated covariance matrix based at least in part on the covariance matrix and a number of the antennas of the plurality of antennas associated with transmit operations at the UE, where the number of the antennas associated with transmit operations at the UE is fewer than a total number of the antennas, precode a SRS using the approximated covariance matrix, and transmit the precoded SRS using the antennas associated with transmit operations.

In some examples of the method, apparatus, and non-transitory computer-readable medium described above, the approximated covariance matrix may comprise a number of sub-matrices, where each sub-matrix is associated with a number of antennas corresponding to a same transmission time. Some examples of the method, apparatus, and non-transitory computer-readable medium described above may further include processes, features, means, or instructions for transmitting different portions of the precoded SRS at different times. Some examples of the method, apparatus, and non-transitory computer-readable medium described above may further include processes, features, means, or instructions for transmitting a message to a base station containing an indication of a transmission timing of the different portions of the precoded SRS.

In some examples of the method, apparatus, and non-transitory computer-readable medium described above, the message may comprise a radio resource control (RRC) configuration message. In some examples of the method, apparatus, and non-transitory computer-readable medium described above, the generated approximated covariance matrix is based at least in part on a downlink (DL) interference level or a signal-to-noise ratio (SNR) received at each antenna of the plurality of antennas. In some examples of the method, apparatus, and non-transitory computer-readable medium described above, the approximated covariance matrix is a block diagonal matrix.

Some examples of the method, apparatus, and non-transitory computer-readable medium described above may further include processes, features, means, or instructions for selecting the approximated covariance matrix based at least in part on a difference between Eigen directions of the approximated covariance matrix and Eigen directions of the interference and noise covariance matrix.

DETAILED DESCRIPTION

Figure 1:
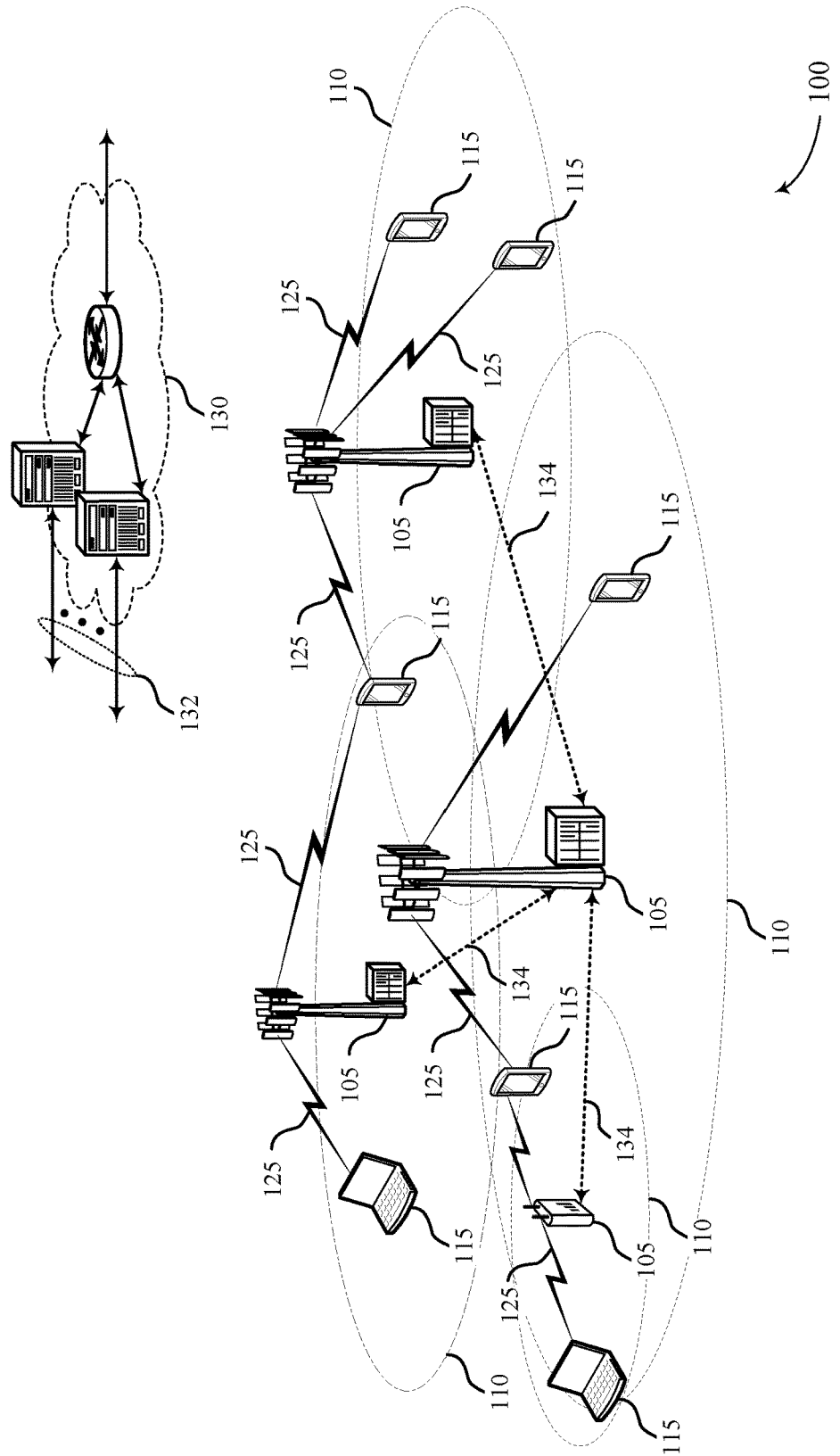
FIG. 1 illustrates an example of a wireless communications system that supports precoded SRS transmission with asymmetric transmit and receive antennas in accordance with aspects of the present disclosure.

A user equipment (UE) may establish a connection with a base station. The base station may be a serving cell for the UE, and may be associated with a network operator. In some cases, the UE may perform interference and noise covariance measurements at a number of antennas associated with operations at the UE. The UE may use the covariance measurements to precode sounding reference signal (SRS) transmissions. The UE may transmit the precoded SRS transmissions to the base station. The base station may receive the precoded SRS transmissions, and evaluate a quality of an uplink (UL) channel to support UL grants for the UE. The precoded SRS transmission may, additionally or alternatively, be used to control UL transmission power.

The base station may use the precoded SRS transmissions to identify at least a signal-to-interference-plus-noise ratio (SINR) post minimum means square error (MMSE) of the number of antennas of the UE for downlink (DL) communication, UL communication, or both. The base station may also use the identified SINR to select a precoder, a rank, a modulation-coding-scheme (MCS), or a combination thereof for the UE. The UE may also be within communication range of a neighboring base station, in a neighboring cell. The neighboring base station may be configured by a network operator that is same or different compared to the base station of the serving cell. The precoded SRS transmission may also be transmitted by the UE to the neighboring base station. The neighboring base station may modify an operating characteristic based on the received precoded SRS transmission. For example, the neighboring base station may modify a rank dimension or UL transmission power parameter.

By precoding SRS transmission with the covariance measurements, the UE may transmit an interference and noise covariance measurement without a separate dedicated transmission to the base station. Similarly, the base station may receive the measured interference and noise covariance without a separate dedicated reception. However, some UEs may be configured to use fewer antennas during transmit operations than receive operations. For example, a UE may be configured with hardware for fewer transmit chains than receive chains, meaning that the UE is configured to perform transmit operations with fewer antennas than are used for receive operations. In these cases, a covariance matrix corresponding to measurements performed at the receive antennas may have a higher dimension than the UE is capable of using to precode SRS transmissions.

In the case that a UE is configured to use fewer transmit antennas than receive antennas, the UE may approximate a full interference and covariance matrix as a block diagonal matrix, and precode separate SRS transmissions using different portions of the approximated covariance matrix. Alternatively, the UE may use different antenna groups to precode SRS transmission using different portions of the interference and noise covariance matrix. In some cases, a UE may transmit precoded SRS transmission using multiple symbols or tones. Since the transmit capability of the UE may be limited by the number of transmit antennas, different antenna groups may transmit precoded SRS transmission to a base station during each symbol or tone. The base station may collect multiple precoded SRS transmissions over multiple symbols or tones, and determine an SNR or interference level from the collected precoded SRS transmissions. In some cases, for the UE to improve an overhead cost (e.g., resources, transmission power), the UE may use split symbol numerology to transmit multiple precoded SRS transmissions. Thus, precoding SRS transmissions with interference and noise covariance information for UEs configured to use fewer transmit antennas than receive antennas may also provide and support improvements to wireless communication systems, including enhanced coexistence, higher data rate, capacity, and spectral efficiency.

Aspects of the disclosure are initially described in the context of a wireless communications system. Exemplary UEs, base stations (e.g., eNB, gNB), systems, and process flows for supporting precoded SRS transmission with asymmetric transmit and receive antennas are described. Aspects of the disclosure are further illustrated by and described with reference to apparatus diagrams, system diagrams, and flowcharts that relate to precoded SRS transmission with asymmetric transmit and receive antennas.

FIG. 1 illustrates an example of a wireless communications system 100 that supports precoded SRS transmission with asymmetric transmit and receive antenna, in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

A UE 115 may establish a connection with one or more base stations 105. As part of establishing the connection with a base station 105, the base station 105 may allocate a portion of a system bandwidth for the UE 115 to use for SRS transmissions. In some cases, UE 115 may transmit a report to base station 105 a number of receive antennas, a number of transmit antennas, or both. UE 115 may transmit the report in an RRC message. The RRC message may be an RRC connection setup, an RRC connection reconfiguration, or both. The RRC message may specify UE capabilities, for example by reporting a total number of receive antennas and a total number of transmit antennas supported by UE 115.

Base station 105 may receive the RRC message and identify that UE 115 has fewer transmit antennas than receive antennas. Alternatively, base station 105 may identify that UE 115 has fewer receive antennas than transmit antennas based on the report. Based on the identification, the base station 105 or another network device may determine an SRS transmission schedule of the UE 115. UE 115 may transmit SRS transmission(s) in a subframe or in multiple subframes. Additionally or alternatively, UE 115 may transmit SRS transmission(s) in symbols or tones.

A base station 105 may receive SRS transmissions and evaluate a channel quality of an UL channel to support UL grants for a UE 115. In addition, the SRS may also be used to control UL power. In some cases, the SRS transmissions by the UE 115 may be precoded with interference and noise covariance matrix. The interference and noise covariance matrix may be an $N_R \times N_T$ matrix. That is, interference and noise covariance matrix may have $N_R$ rows and $N_T$ columns. $N_R$ and $N_T$ may be associated with a number of receive antennas and a number of transmit antennas. In the case, where the number of receive antennas equals the number of transmit antennas, $N_R = N_T = N_R$ and N. By precoding the SRS transmissions with an interference and noise covariance matrix, UE 115 may transmit feedback associated with DL communications as part of the SRS transmissions. For example, the feedback may include interference and noise levels observed and measured at different antennas of the UE 115. UE 115 is therefore capable of transmitting covariance information as part of the SRS transmissions. In other words, UE 115 may avoid transmitting covariance information and SRS separately. Precoded SRS with covariance information may also provide and support improvements to wireless communications system 100 by providing enhanced coexistence, higher data rates, increased capacity, and improved spectral efficiency.

In some examples, UE 115 may have a number of antennas for communicating with base stations 105 and other devices (e.g., other UEs 115) in the wireless communications system 100. UE 115 may have a separate number of transmit antennas compared to receive antennas. As such, transmit capability of UE 115 may be limited by the number of transmit antennas available for transmission. In some cases, UE 115 may precode an interference and noise covariance matrix with SRS transmission on all transmit antennas. For example, UE 115 may have four receive antennas, but may be limited to transmitting using two transmit antennas. Additionally, UE 115 may measure received interference and noise level on all antennas. The UE 115 may however, at a given time transmit SRS weighted by a scalar due to the two transmit antennas. As a result, the spatial signature of UE 115 may be lacking.

Since the transmit capability of UE 115 may be limited by the number of transmit antennas, during each SRS symbol or tone a portion of the transmit antennas of UE 115 may transmit a SRS transmission to base station 105. Base station 105 of a serving cell or neighboring cell may collect the multiple SRS transmission over multiple SRS symbols or tones and determine a SNR or interference level based on the collected SRS transmissions. In some cases, to improve a cost overhead, UE 115 may utilize split symbol numerology to transmit multiple SRS transmissions.

UE 115 may support precoded SRS transmission with asymmetric transmit and receive antenna configurations by approximating a covariance matrix. UE 115 may obtain an interference and noise covariance matrix for a plurality of antennas of UE 115. UE 115 may generate an approximated covariance matrix based on the covariance matrix and a number of the antennas of the plurality of antennas associated with transmit operations at the UE 115. The number of the antennas associated with transmit operations at UE 115 may be fewer than a total number of the antennas. In some examples, to generate the covariance matrix, UE 115 may approximate the covariance matrix to a block diagonal matrix. Each block of the block diagonal matrix may be denoted as a sub-matrix and may be associated with antennas of UE 115 that may transmit at a same time; for example, during a same symbol or tone. UE 115 may additionally or alternatively, select an approximated covariance matrix based on a difference between Eigen directions of the approximated covariance matrix and Eigen directions of the interference and noise covariance matrix.

Base stations 105 may receive a message including an indication of a transmission timing of different portions of precoded SRS. UE 115 may generate a message including a transmission timing of different portions of the precoded SRS. The message may include a RRC configuration message. UE 115 may also communicate with a neighboring base station 105 that may be in a neighboring cell of a wireless communications system 100. UE 115 may also transmit covariance information of the interference and noise covariance matrix with the SRS transmission to the neighboring base station 105. The neighboring base station may, additionally or alternatively, modify an operating characteristic based on the received covariance information and SRS. The neighboring base station may also be configured by a network operator that is same or different compared to the base station of the serving cell. In some examples, the operation characteristic may include modifying a rank dimension or UL transmission power.

In some examples, the different numbers of transmit and receive antennas available to the UE may introduce spatial loss to SRS precoding. As such, UE 115 may alternatively support precoded SRS transmission with asymmetric transmit and receive antenna configuration by obtaining an interference and noise covariance matrix for a plurality of antennas of a UE 115. The plurality of antennas may include a first antenna group and a second antenna group. In some cases, the first antenna group and the second antenna group are configured to transmit at different times. In other examples, just one of the antenna groups is associated with transmit operations. UE 115 may determine a plurality of precoders for each antenna group based on a partitioning of the covariance matrix. In response to partitioning the covariance matrix, UE 115 may precode SRS for each antenna group using the determined plurality of precoders, and perform a separate SRS transmission for each determined precoder of each antenna group.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. Control information and data may be multiplexed on an UL channel or DL channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be coupled with the P-GW. The P-GW may provide IP address allocation as well as other functions. The P-GW may be coupled with the network operators IP services. The operators IP services may include the Internet, the Intranet, an IP Multimedia Subsystem (IMS), and a Packet-Switched (PS) Streaming Service. The core network 130 may provide user authentication, access authorization, tracking, Internet Protocol (IP) connectivity, and other access, routing, or mobility functions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device, such as a base station 105, or a core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
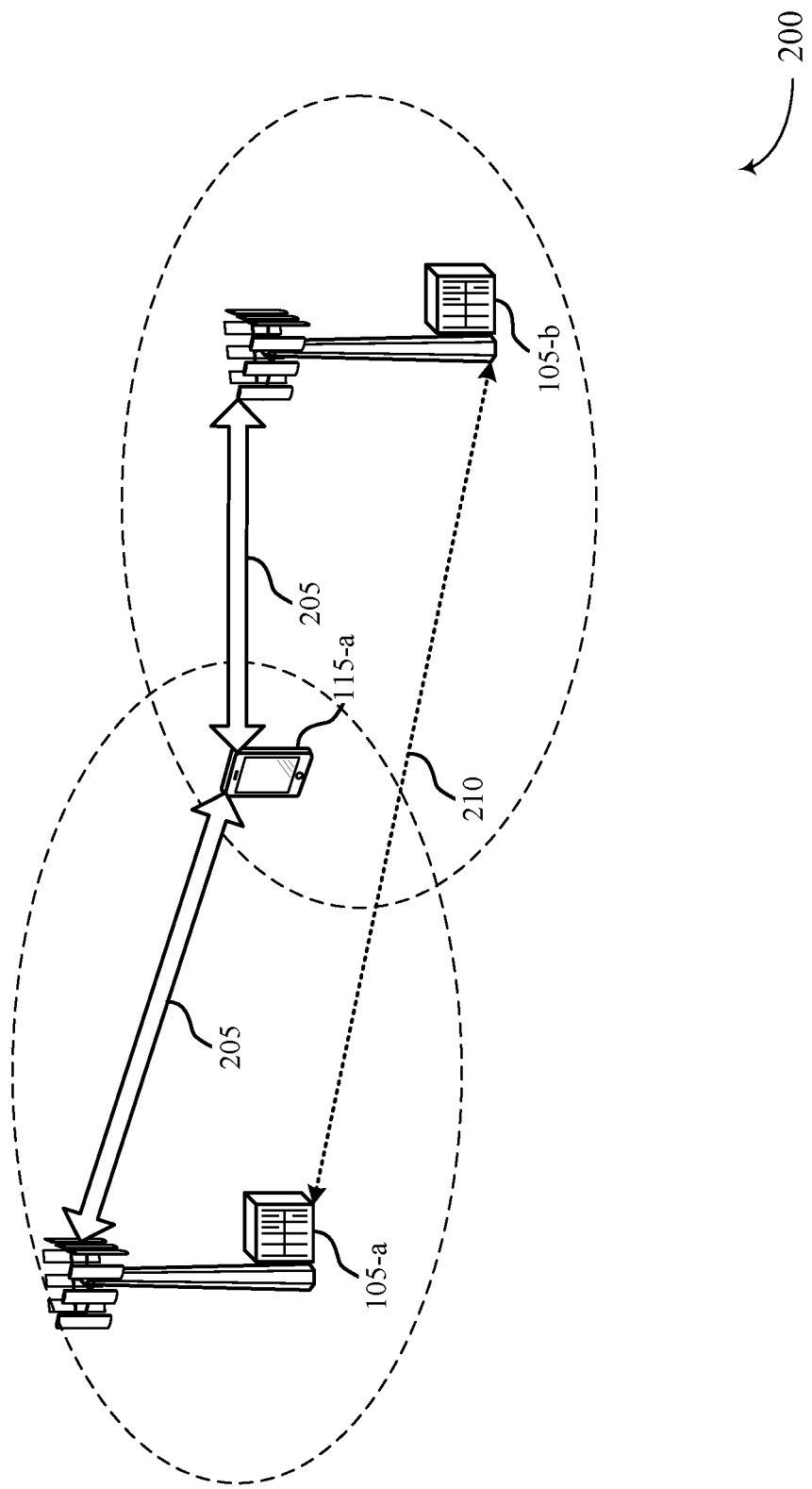
FIG. 2 illustrates an example of a wireless communications system that supports precoded SRS transmission with asymmetric transmit and receive antennas in accordance with aspects of the present disclosure.

FIG. 2 illustrates an example of a wireless communications system 200 that supports precoded SRS transmission with asymmetric transmit and receive antennas, in accordance with various aspects of the present disclosure. Wireless communications system 200 may be an example of one or more aspects of wireless communications system 100 of FIG. 1. In some examples, the wireless communications system 200 may implement an NR or other 5G cellular network. Wireless communications system 200 may include UE 115-a, base station 105-a, and base station 105-b, which may be one or more aspects of UE 115 and base station 105 as described with reference to FIG. 1.

UE 115-a may establish a connection 205 with base station 105-a. Additionally or alternatively, UE 115-a may establish a connection 205 with base station 105-b. At least one of base station 105-a or 105-b may allocate a portion of a system bandwidth for the UE 115-a to use for precoded SRS transmissions. In some cases, UE 115-a may transmit a report to base station 105-a or 105-b indicating a number of receive antennas, a number of transmit antennas, or both. UE 115-a may transmit the report in an RRC message. The RRC message may be an RRC connection setup message, RRC connection reconfiguration message, or both. Base station 105-a or 105-b may receive the report and identify UE 115-a has fewer transmit antennas available than receive antennas. Based on the identification, base station 105-a, base station 105-b, or another network device may determine a transmission schedule of UE 115-a. For example, the transmission schedule may indicate uplink time and frequency resources for UE SRS transmission(s) in addition to how those resources are assigned to SRS transmissions associated with different antenna groups or covariance precoders. The transmission schedule may be associated with precoded SRS transmission(s) from UE 115-a.

UE 115-a may transmit precoded SRS transmission(s) in a subframe or in multiple subframes; additionally or alternatively, UE 115-a may transmit precoded SRS transmission(s) in multiple OFDM symbols or frequency tones. That is, UE 115-a may transmit precoded SRS transmission(s) using transmit antennas during different symbol periods of a subframe via connection 205. For example, UE 115-a may transmit a first precoded SRS transmission during a first symbol period (e.g., symbol 0), a second precoded SRS transmission during a second symbol period (e.g., symbol 1), etc. In some cases, UE 115-a may also transmit precoded SRS transmission during other symbol periods of a subframe. Alternatively, UE 115-a may transmit precoded SRS transmission during different tones of a symbol.

In some cases, UE 115-a may precode an SRS transmission using or based on an interference and noise covariance matrix. If UE 115-a does not have a same number of transmit antennas compared to receive antennas, the dimension of precoding matrix supported by the UE for transmit operations may be less than a dimension of the interference and noise covariance matrix obtained using the receive antennas. For example, UE 115-a may have four antennas and use all of them for receive operations, but may be limited to two of the antennas for transmit operations. In this case, the interference and noise covariance matrix may be a 4×4 matrix, but the UE may be capable of precoding a transmission using up to a 2×2 matrix without losing a spatial signature of the interference and noise covariance information. One or more of the following techniques may be employed to preserve the spatial integrity of the interference and noise covariance information while transmitting SRS reports using a reduced number of transmit antennas.

According to a first technique, UE 115-a may approximate the interference and noise covariance matrix as a block diagonal matrix. For example, the UE may compute a block diagonal matrix having the closest eigenvectors, eigendirection, or SINR values to that of the original interference and noise covariance matrix. Each non-zero block of the block diagonal matrix may correspond to a precoder for use by antennas of UE 115-a that may transmit simultaneously; for example, during a same symbol or tone. The UE may then perform separate SRS transmissions, using the different precoders on separate frequency tones or time resources, to provide a representation of the interference and noise covariance matrix to the base station.

Returning to the example of a UE 115-a having four total antennas (i.e., antennas 0-3, N=4) and two transmit antennas may be used for transmit operations by the UE 115-a at a given time. The antennas of the UE 115-a may be divided into two antennas groups: $R_0$ and $R_1$, with each group containing two antennas. The interference and noise covariance matrix data observed at all antennas can be represented as the following block matrix:

$$R_{i,j} = \begin{bmatrix} R_{00} & R_{01} \\ R_{10} & R_{11} \end{bmatrix} \tag{1}$$

where $R_{i,j}$ denotes the covariance between group i and group j. UE 115-a may precode SRS using the approximated covariance matrix, and transmit the precoded SRS using the antennas associated with transmit operations.

The approximated covariance matrix may also be represented by a number of sub-matrices. For instance, each of $R_{00}$, $R_{01}$, $R_{10}$, and $R_{11}$ may be a 2×2 sub-matrix.

The block diagonal approximation of $R_{i,j}$ may take the following form:

$$R'_{i,j} = \begin{bmatrix} R'_{00} & 0 \\ 0 & R'_{11} \end{bmatrix} \tag{2}$$

As noted above, $R'_{i,j}$ may be obtaining by computing the closest block diagonal matrix equivalent of $R_{i,j}$, or alternatively, a block diagonal matrix with eigenvector, eigendirection, or SINR parameters within a threshold difference of the corresponding parameters in $R_{i,j}$.

In this example, $R'_{i,j}$ has two non-zero submatrices: $R'_{00}$ and $R'_{11}$. The UE 115-a may use the non-zero submatrices as precoders for separate SRS transmissions, which may occur at different times, on different frequency tones, or both. The UE 115-a and base stations 105-a, 105-b may each know which uplink resources correspond to which SRS transmissions by the UE based on the number of available transmit and receive antennas at the UE 115-a and standardized or otherwise configured SRS uplink resources.

Accordingly, at an assigned time, UE 115-a may transmit SRS whitened (i.e., effective precoded channel) by corresponding sub-matrices observed by an antenna group. UE 115-a may transmit different portions of precoded SRS at different times. For example, UE 115-a may use $R'_{00}$ to precode a first SRS transmission and $R'_{11}$ to precode a second SRS transmission. In some cases, the first SRS transmission and the second SRS transmission may occur at different times (i.e. during different OFDM symbols, sub-symbols, sub-frames, or target time intervals (TTIs)). Alternatively, the first SRS transmission and the second SRS transmission may be occur at the same time (i.e. during the same OFDM symbol or sub-symbol). In the case that UE 115-a uses split symbol numerology, the first SRS transmission may be occur during one sub-symbol of an OFDM symbol and the second SRS transmission may occur during a different sub-symbol of the same OFDM symbol. When both sub-symbols are combined they may encompass a single OFDM symbol. Alternatively, UE 115-a may perform the SRS transmissions during different tones of the same OFDM symbol. For example, UE 115-a may use $R'_{00}$ to precode one or more even tones and $R_{11}$ to precode one or more odd tones, or vice versa. UE 115-a may generate a message including transmission timing of different portions of precoded SRS. The message may include a RRC configuration message. Base stations 105-a may receive a message including an indication of a transmission timing of different portions of the precoded SRS. Based on the indication, base station 105-a may listen for the precoded SRS transmissions.

According to a second technique, UE 115-a may use different blocks of an unaltered interference and noise covariance matrix to precode multiple SRS transmissions. Returning to the example of a UE 115-a having four total antennas and two transmit antennas, the antennas may be divided into two antenna groups: $R_0$ and $R_1$, with each group containing two antennas. The interference and covariance matrix data can be represented in block form as Matrix 1 above, which can also be represented as the following block precoder matrix:

$$R_{i,j} = \begin{bmatrix} A & B \\ B^H & D \end{bmatrix}^{-1/2} \quad (3)$$

where 2×2 precoders A, B, $B^H$, and D are equivalent to $R_{00}$, $R_{01}$, $R_{10}$, and $R_{11}$, respectively, of Matrix 1, and $B^H$ represents the Hermitian transpose of B. Each of these precoders may be used for a separate SRS transmission by UE 115-a.

The DL channel matrix H may be represented by the following equation:

$$H_{i,j} = \begin{bmatrix} H_{00} & H_{01} \\ H_{10} & H_{11} \end{bmatrix} \quad (4)$$

where i and j represent the channel from UE antenna transmit group i and base station 105-a antenna receive group j. Relying on reciprocal uplink and downlink channels, from the perspective of base station 105-a, the full whitened (i.e., effective precoded channel) precoded SRS transmission by UE 115-a may be represented by the following equation:

$$R_{i,j}^{-1/2} H_{i,j} = [AH_{00} + BH_{10} AH_{01} + BH_{11}; B^H H_{00} + DH_{10} B^H H_{01} + DH_{11}] \quad (5)$$

Because $H_{00}$ and $H_{10}$ or $H_{10}$ and $H_{11}$ may be transmitted at different times due to the nature of the antenna configuration of UE 115-a, UE 115-a may not be able to fully realize $R_{i,j}^{-1/2} H_{i,j}$. However, $R_{i,j}^{-1/2} H_{i,j}$ may be represented by the following equation:

$$R_{i,j}^{-1/2} H_{i,j} = \begin{bmatrix} AH_{00} & AH_{01} \\ B^H H_{00} & B^H H_{01} \end{bmatrix} + \begin{bmatrix} BH_{10} & BH_{11} \\ DH_{10} & DH_{11} \end{bmatrix} \quad (6)$$

Using this representation of $R_{i,j}^{-1/2} H_{i,j}$, UE 115-a may perform a separate SRS transmission for each determined precoder of each antenna group. Specifically, UE 115-a may use precoders A and $B^H$ for respective separate SRS transmissions over antenna group 0. UE 115-a may also use precoders B and D for respective separate SRS transmissions over antenna group 1. In some cases, different precoders may be applied on different SRS tones or different SRS symbols. For example, UE 115-a may transmit precoder A or B on even tones and precoder $B^H$ or D on odd tones. Alternatively, UE 115-a may perform SRS transmissions using different antenna groups at adjacent OFDM symbols or sub-symbols. That is, SRS transmissions at one OFDM symbol may be precoded with A or B, and SRS transmissions at a second OFDM symbol may be precoded with $B^H$ or D. In some cases, UE 115-a may assume that tones for precoders A and $B^H$ or precoders B and D are experiencing a same channel. As a result, base station 105-a may receive $AH_{00}$, $AH_{01}$, $B^H H_{00}$, and $B^H H_{01}$ or $BH_{10}$, $BH_{11}$, $DH_{10}$, and $DH_{11}$. Additionally, base station 105-a may combine the received signal to obtain the following precoded SRS transmission represented equation (5). Base station 105-a may obtain a SINR information based on equation (5).

Figure 3:
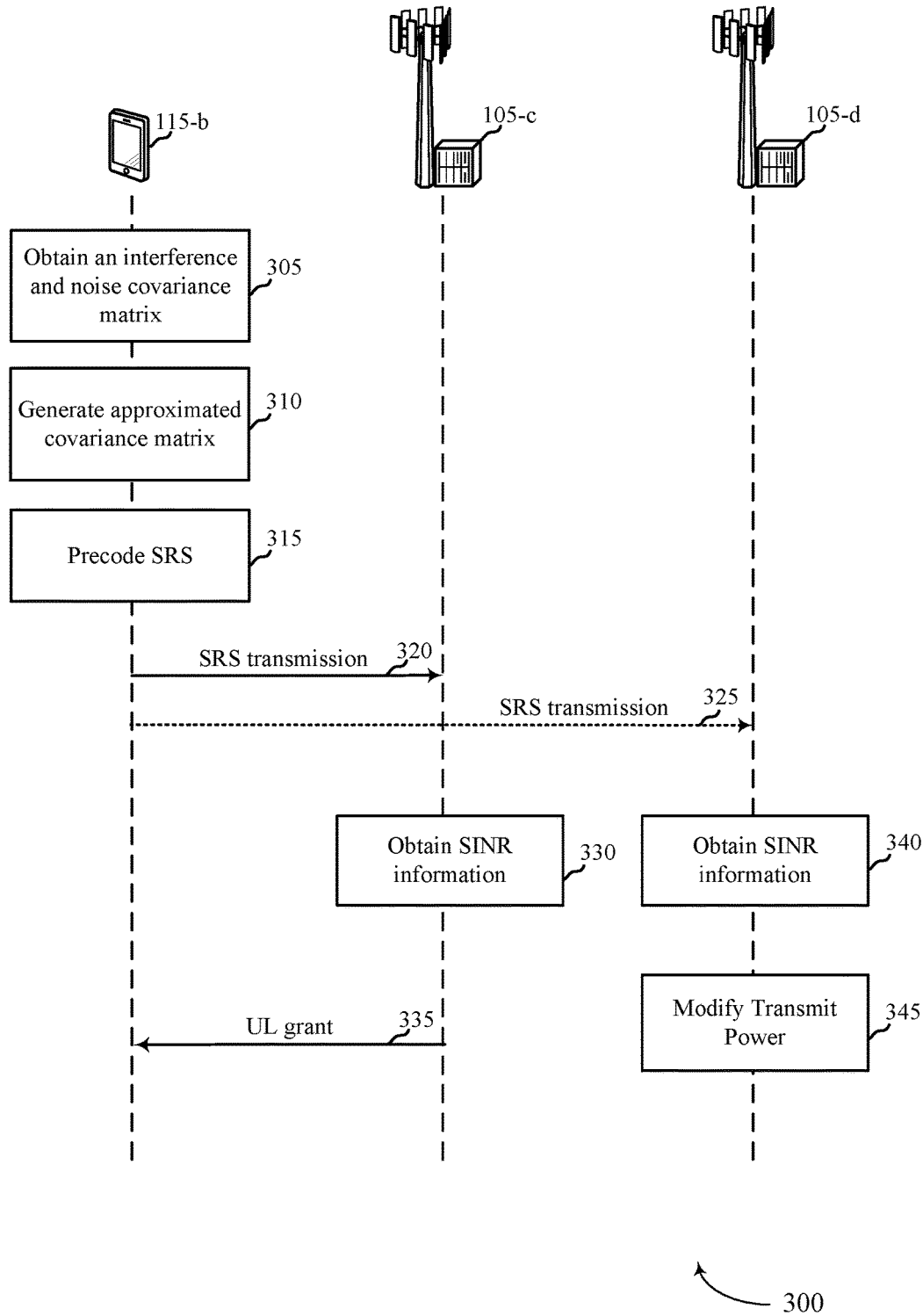
FIGS. 3 and 4 illustrate examples of process flows that support precoded SRS transmission with asymmetric transmit and receive antennas in accordance with aspects of the present disclosure.

FIG. 3 illustrates an example of a process flow 300 that supports precoded SRS transmission with asymmetric transmit and receive antennas in accordance with various aspects of the present disclosure. In some examples, process flow 300 may implement aspects of wireless communications system 100 and 200. Each of UE 115-b, base station 105-c, or base station 105-d may be an example of aspects of a respective one of the UEs 115 or base stations 105 described with reference to FIG. 1 or 2. In some cases, base station 105-c may include a master gNB and the base station 105-d may include a secondary gNB.

In the following description of the process flow 300, the operations between UE 115-b, base station 105-c, or base station 105-d may be transmitted in a different order than the exemplary order shown, or the operations performed by UE 115-b, the base station 105-c, or base station 105-d may be performed in different orders or at different times. Some operations may also be left out of the process flow 300, or other operations may be added to the process flow 300.

In some examples, process flow 300 may commence with UE 115-b establishing a connection with base station 105-c, with base station 105-d, or both. Each of base station 105-c and base station 105-d may provide radio resources to UE 115-b for respective UL communications. Additionally or alternatively, each of base station 105-c and base station 105-d may also provide radio resources to UE 115-b for respective DL communications. In some examples, when transmitting UL communications to the base station 105-c and base station 105-d, UE 115-b may transmit UL communications based on an indication of an allocation of UL transmit power between base station 105-c and base station 105-d for the UE 115-b. The indication may be provided to the UE 115-b by base station 105-c or base station 105-d.

At block 305, UE 115-b may obtain an interference and noise covariance matrix. The interference and noise covariance matrix may be an $N_R \times N_T$ matrix. That is, interference and noise covariance matrix may have $N_R$ rows and $N_T$ columns. $N_R$ may be associated with a number of receive antennas of UE 115-b, and $N_T$ may be a number of transmit antennas of UE 115-b. In the case, where the number of receive antennas equals the number of transmit antennas, $N_R = N_T = N$.

At block 310, UE 115-b may generate an approximated covariance matrix. In some examples, UE 115-b may generate the approximated covariance matrix based on the interference and noise covariance matrix and a number of antennas of a plurality of antennas associated with transmit operations at the UE 115-b. The number of the antennas associated with transmit operations at the UE may be fewer than a total number of the antennas, in some examples. Additionally, the generated approximated covariance matrix may be based on a DL interference level or a SNR received at each antenna of the plurality of antennas of UE 115-*b*. In some cases, UE 115-*b* may select the approximated covariance matrix based on a difference between Eigen directions of the approximated covariance matrix and Eigen directions of the interference and noise covariance matrix.

At block 315, UE 115-*b* may precode one or more SRS transmissions using the approximated covariance matrix. By precoding the SRS transmissions with an interference and noise covariance matrix, UE 115-*b* may transmit feedback associated with DL as part of the SRS transmissions. In addition, precoding the SRS with covariance matrix may also provide enhanced coexistence, higher data rate, increased capacity, and improved spectral efficiency between UE 115-*b* and base station 105-*c*, base station 105-*d*, or both. UE 115-*b* may transmit the precoded SRS in one or more symbols or tones to base station 105-*c* or base station 105-*d*, in some cases. UE 115-*b* may transmit the precoded SRS using antennas associated with transmit operations of UE 115-*b* to base station 105-*c* via SRS transmission 320 and optionally to base station 105-*d* via SRS transmission 325. In some examples, UE 115-*b* may transmit the precoded SRS to base station 105-*c*.

At block 330, base station 105-*c* may obtain SINR information from the received precoded SRS transmissions of UE 115-*b*. Base station 105-*c* may utilize the SINR information to determine and select a precoder, a rank, a MCS, or a combination thereof for UE 115-*b*. In some examples, base station 105-*c* may modify UL scheduling for UE 115-*b* based on the SINR information. Base station 105-*c* may transmit an UL grant 335 to UE 115-*b* based on the SINR information.

At block 340, base station 105-*d* may also obtain SINR information from the received precoded SRS transmission of UE 115-*b*. Base station 105-*d* may receive different portions of the precoded SRS at different times. Base station 105-*d* may also be a neighboring cell. In some cases, base station 105-*d* may identify a rank of a channel matrix associated with the precoded SRS, and determine a number of simultaneous transmission opportunities for transmission of data streams based on the rank. At block 345, base station 105-*d* may modify a transmit power based on the precoded SRS.

Figure 4:
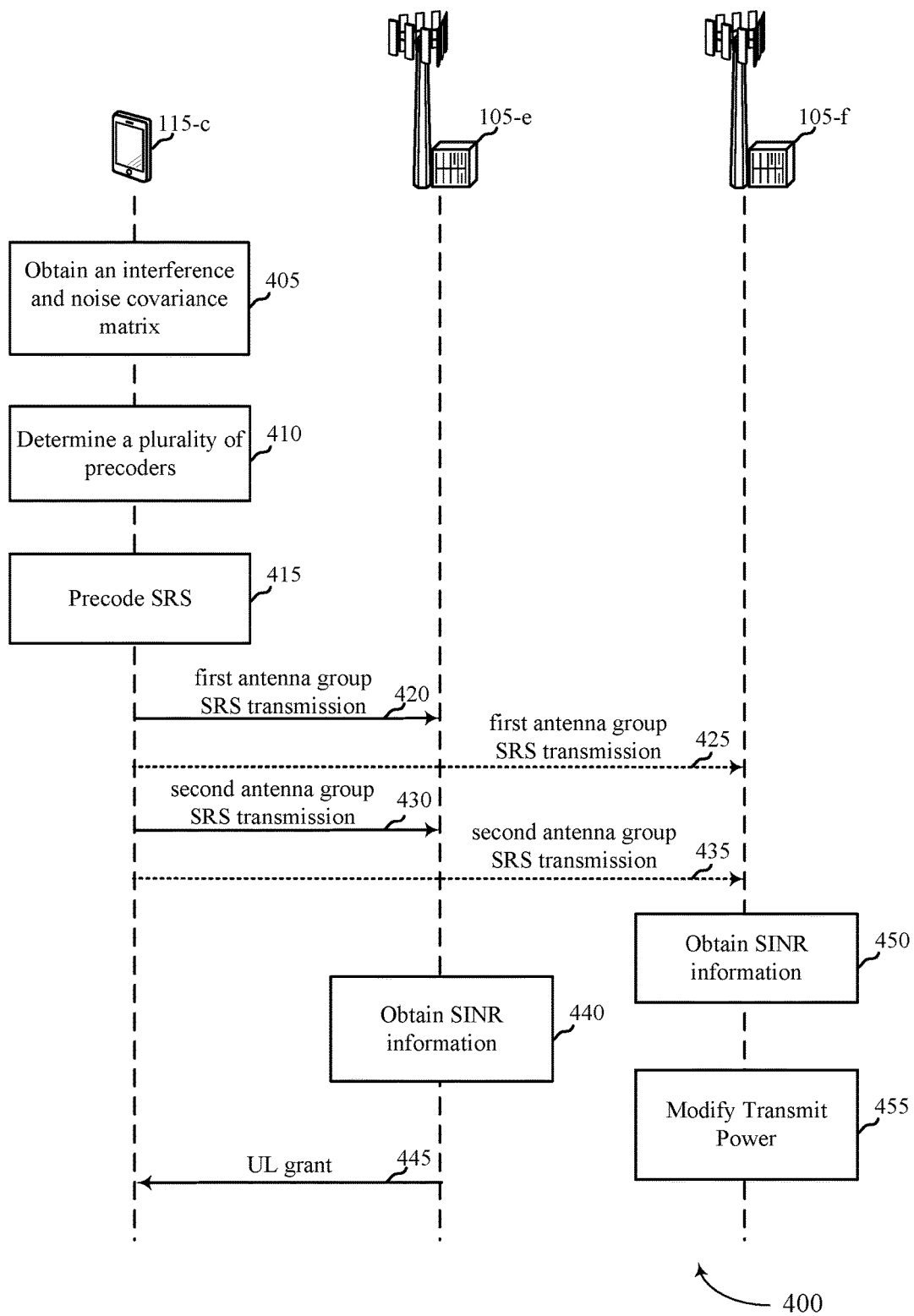

FIG. 4 illustrates an example of a process flow 400 that supports precoded SRS transmission with asymmetric transmit and receive antennas in accordance with various aspects of the present disclosure. In some examples, process flow 400 may implement aspects of wireless communications system 100 and 200. Each of UE 115-*c*, base station 105-*e*, or base station 105-*f* may be an example of aspects of a respective one of the UEs 115 or base stations 105 described with reference to FIG. 1 or 2. In some cases, base station 105-*e* may include a master gNB and the base station 105-*f* may include a secondary gNB.

In the following description of the process flow 400, the operations between UE 115-*b*, base station 105-*c*, or base station 105-*d* may be transmitted in a different order than the exemplary order shown, or the operations performed by UE 115-*b*, the base station 105-*c*, or base station 105-*d* may be performed in different orders or at different times. Some operations may also be left out of the process flow 400, or other operations may be added to the process flow 400.

In some examples, process flow 400 may commence with UE 115-*c* establishing a connection with base station 105-*e*, a connection with base station 105-*f*, or both. Each of base station 105-*e* and base station 105-*f* may provide radio resources to UE 115-*c* for respective UL communications. Additionally or alternatively, each of base station 105-*e* and base station 105-*f* may also provide radio resources to UE 115-*c* for respective DL communications. In some examples, when transmitting UL communications to the base station 105-*e* and base station 105-*f*, UE 115-*c* may transmit UL communications based on an indication of an allocation of UL transmit power between base station 105-*e* and base station 105-*f* for the UE 115-*c*. The indication may be provided to the UE 115-*c* by base station 105-*e* or base station 105-*f*.

At block 405, UE 115-*c* may obtain an interference and noise covariance matrix. The elements of the interference and noise covariance matrix may be associated with a number of receive antennas and a number of transmit antennas of UE 115-*c*. As such, UE 115-*c* may obtain a covariance matrix for a plurality of antennas of UE 115-*c*. The plurality of antennas may include a number of antenna groups. For example, UE 115-*c* may have a first antenna group and a second antenna group. The first antenna group and the second antenna group may each be configured to transmit at different times.

At block 410, UE 115-*c* may determine a plurality of precoders. The plurality of precoders may corresponds to a number of transmit antennas, or a group of antennas. For example, UE 115-*c* may determine a plurality of precoders for a first antenna group and a second antenna group. In some cases, UE 115-*c* may determine a plurality of precoders for each antenna group based on a partitioning of the covariance matrix.

At block 410, UE 115-*c* may precode one or more SRS transmissions. In some cases, UE 115-*c* may precode an SRS for each antenna group, using the determined plurality of precoders. UE 115-*c* may perform a separate precoded SRS transmission, for each determined precoder of each antenna group over different tones or at different times, to base station 105-*e* or base station 105-*f*. For example, UE 115-*c* may perform precoded SRS transmissions with one or more antenna groups on even SRS tones, odd SRS tones, or both. Alternatively, UE 115-*c* may preform precoded SRS transmission with one or more antenna groups on one or more symbols. For instance, UE 115-*c* may transmit the precoded SRS using antennas of a first antenna group to base station 105-*e* via first antenna group SRS transmission 420 and optionally to base station 105-*f* via first antenna group SRS transmission 425. Additionally, UE 115-*c* transmit additional precoded SRS using antennas of a second antenna group to base station 105-*e* via second antenna group SRS transmission 430 and optionally to base station 105-*f* via second antenna group SRS transmission 435.

At block 440, base station 105-*e* may obtain SINR information from the received precoded SRS transmissions from UE 115-*c*. In some cases, base station 105-*e* may collect precoded SRS transmission from the first antenna group SRS transmission 420 and the second antenna group SRS transmission 430, and obtain SINR information based on the collection. Base station 105-*e* may also use the SINR information to determine and select a precoder, a rank, a MCS, or a combination thereof for UE 115-*c*. In some examples, base station 105-*e* may modify UL scheduling for UE 115-*c* based on the SINR information. Base station 105-*e* may transmit an UL grant 445 to UE 115-*c* based on the SINR information.

At block 450, base station 105-*f* may also obtain SINR information from the received precoded SRS transmissions from UE 115-*c*. Base station 105-*d* may receive different portions of the precoded SRS at different times. For instance, base station 105-*f* may collect precoded SRS transmission from the first antenna group SRS transmission 425 and the second antenna group SRS transmission 435, and obtain SINR information based on the collection. In some cases, base station 105-*f* may identify a rank based on the precoded SRS transmission, and determine a number of simultaneous transmission opportunities for transmission of data streams to the UE 115-*c* based on the rank. At block 455, base station 105-*f* may modify a transmit power; for example, based on SINR information associated with the received precoded SRS transmissions.

Figure 5:
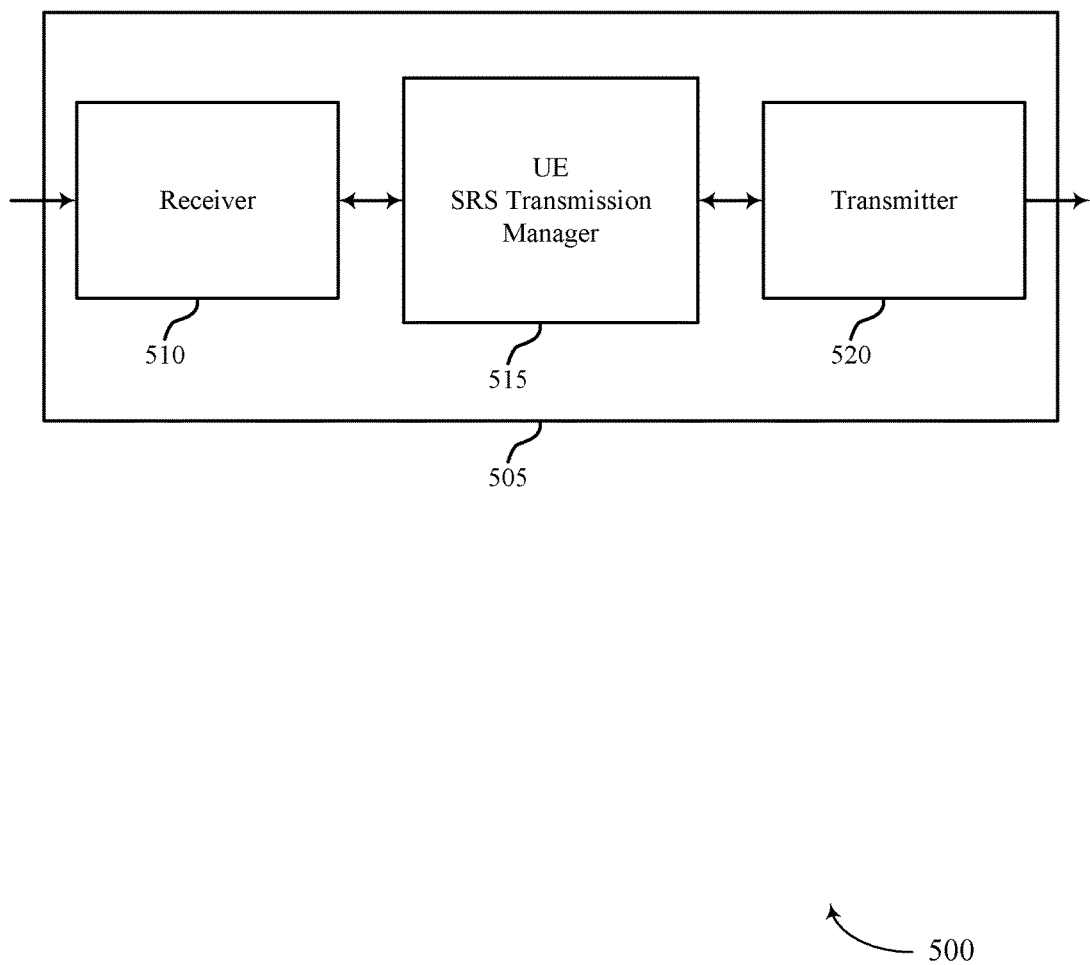
FIGS. 5 through 7 show block diagrams of a device that supports precoded SRS transmission with asymmetric transmit and receive antennas in accordance with aspects of the present disclosure.

FIG. 5 shows a block diagram 500 of a wireless device 505 that supports precoded SRS transmission with asymmetric transmit and receive antennas in accordance with aspects of the present disclosure. Wireless device 505 may be an example of aspects of a UE 115 as described with reference to FIG. 1 or 2. Wireless device 505 may include receiver 510, UE SRS transmission manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to precoded SRS transmission with asymmetric transmit and receive antennas, etc.). Information may be passed on to other components of the device. The receiver 510 may be an example of aspects of the transceiver 835 described with reference to FIG. 8. The receiver 510 may utilize a single antenna or a set of antennas.

UE SRS transmission manager 515 may be an example of aspects of the UE SRS transmission manager 815 described with reference to FIG. 8. UE SRS transmission manager 515 and/or at least some of its various sub-components may be implemented in hardware, software executed by a processor, firmware, or any combination thereof. If implemented in software executed by a processor, the functions of the UE SRS transmission manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE SRS transmission manager 515 and/or at least some of its various sub-components may be physically located at various positions, including being distributed such that portions of functions are implemented at different physical locations by one or more physical devices. In some examples, UE SRS transmission manager 515 and/or at least some of its various sub-components may be a separate and distinct component in accordance with various aspects of the present disclosure. In other examples, UE SRS transmission manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE SRS transmission manager 515 may obtain an interference and noise covariance matrix for a set of antennas of a UE, generate an approximated covariance matrix based on the covariance matrix and a number of the antennas of the set of antennas associated with transmit operations at the UE. The number of the antennas associated with transmit operations at the UE may be fewer than a total number of the antennas. UE SRS transmission manager 515 may precode a SRS using the approximated covariance matrix, and transmit the precoded SRS using the antennas associated with transmit operations.

The UE SRS transmission manager 515 may also obtain an interference and noise covariance matrix for a set of antennas of a UE. The set of antennas may include a first antenna group and a second antenna group. The first antenna group and the second antenna group may be configured to transmit at different times. The UE SRS transmission manager 515 may determine a set of precoders for each antenna group based on a partitioning of the covariance matrix, precode a SRS for each antenna group using the determined set of precoders, and perform a separate SRS transmission for each determined precoder of each antenna group based on the precoding.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
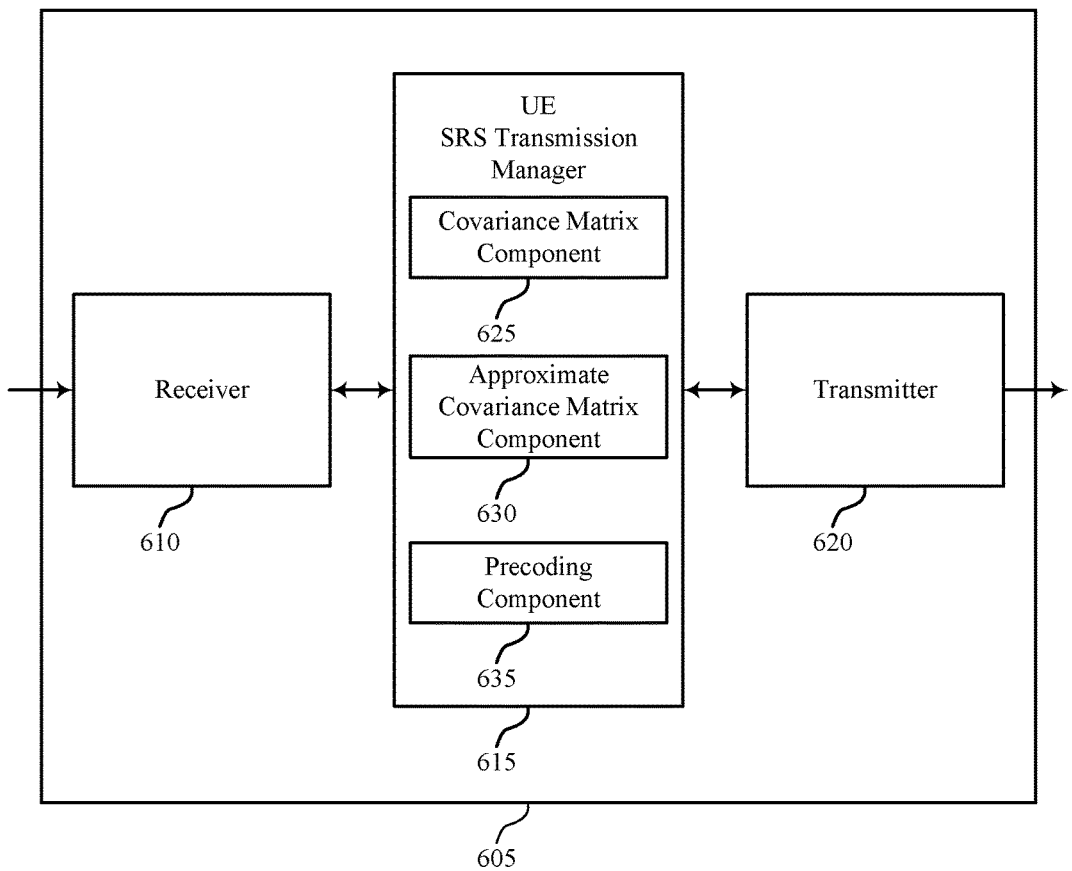

FIG. 6 shows a block diagram 600 of a wireless device 605 that supports precoded SRS transmission with asymmetric transmit and receive antennas in accordance with aspects of the present disclosure. Wireless device 605 may be an example of aspects of a wireless device 505 or a UE 115 as described with reference to FIG. 5. Wireless device 605 may include receiver 610, UE SRS transmission manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to precoded SRS transmission with asymmetric transmit and receive antennas, etc.). Information may be passed on to other components of the device. The receiver 610 may be an example of aspects of the transceiver 835 described with reference to FIG. 8. The receiver 610 may utilize a single antenna or a set of antennas.

UE SRS transmission manager 615 may be an example of aspects of the UE SRS transmission manager 815 described with reference to FIG. 8. UE SRS transmission manager 615 may also include covariance matrix component 625, approximate covariance matrix component 630, and precoding component 635.

Covariance matrix component 625 may obtain an interference and noise covariance matrix for a set of antennas of a UE and obtain an interference and noise covariance matrix for a set of antennas of a UE. The set of antennas may include a first antenna group and a second antenna group. The first antenna group and the second antenna group may be configured to transmit at different times.

Approximate covariance matrix component 630 may generate an approximated covariance matrix based on the covariance matrix and a number of the antennas of the set of antennas associated with transmit operations at the UE. The number of the antennas associated with transmit operations at the UE may be fewer than a total number of the antennas. Approximate covariance matrix component 630 may select the approximated covariance matrix based on a difference between Eigen directions of the approximated covariance matrix and Eigen directions of the interference and noise covariance matrix. In some cases, the approximated covariance matrix includes a number of sub-matrices. Each sub-matrix may be associated with a number of antennas corresponding to a same transmission time. In some cases, the generated approximated covariance matrix may be based on a DL interference level or a SNR received at each antenna of the set of antennas. In some cases, the approximated covariance matrix may be a block diagonal matrix.

Precoding component 635 may precode a SRS using the approximated covariance matrix, and transmit different portions of the precoded SRS at different times. In some examples, precoding component 635 may transmit a message to a base station including an indication of a transmission timing of the different portions of the precoded SRS. Additionally or alternatively, transmit the precoded SRS using the antennas associated with transmit operations. In some examples, precoding component 635 may precode a SRS for each antenna group using the determined set of precoders, and perform a separate SRS transmission for each determined precoder of each antenna group based on the precoding. In some examples, precoding component 635 may perform a separate SRS transmission for each determined precoder of each antenna group over different tones or at different times.

In some examples, precoding component 635 may transmit a message to a base station including an indication of a transmission timing of the separate SRS transmissions for each determined precoder of each antenna group, and determine a set of precoders for each antenna group based on a partitioning of the covariance matrix. In some cases, the message includes a RRC configuration message. In some cases, the message includes a RRC configuration message.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
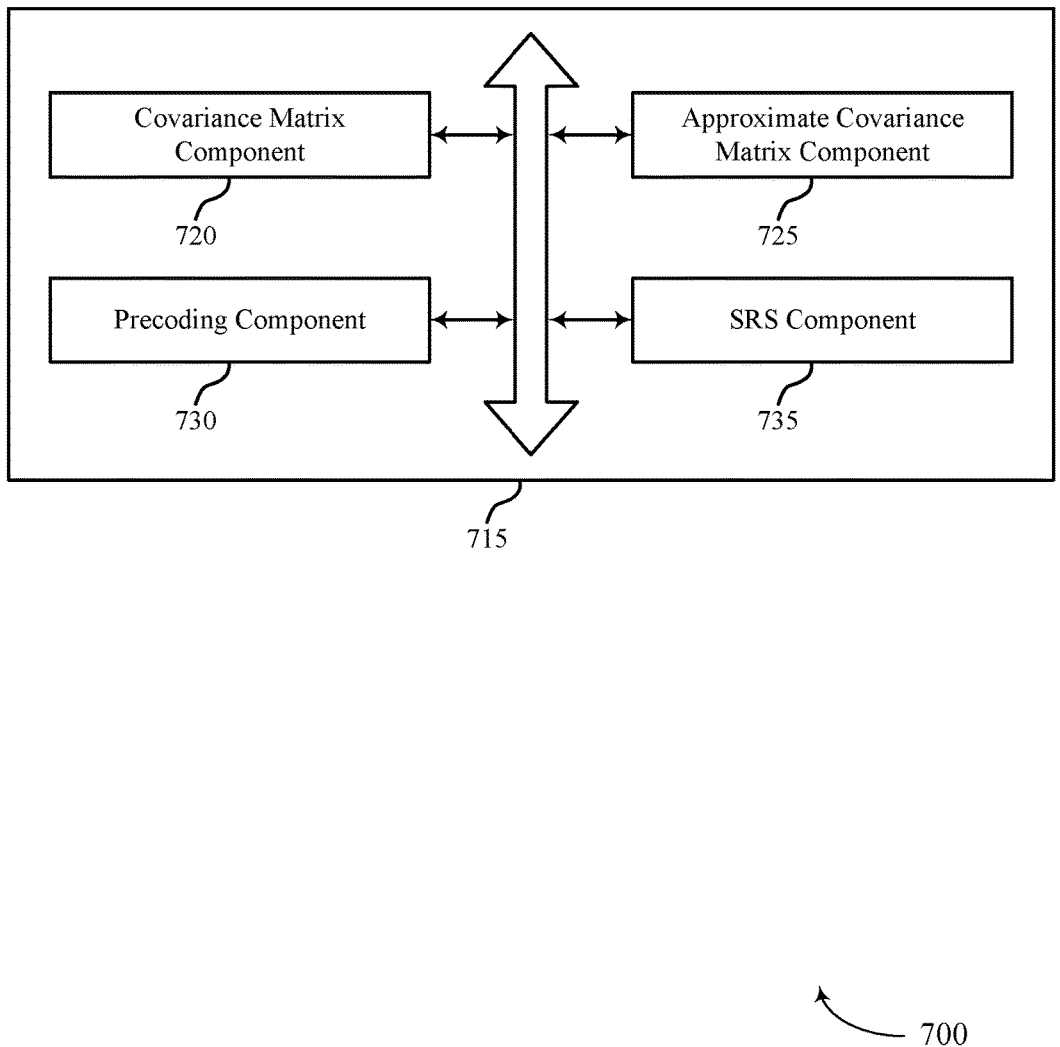

FIG. 7 shows a block diagram 700 of a UE SRS transmission manager 715 that supports precoded SRS transmission with asymmetric transmit and receive antennas in accordance with aspects of the present disclosure. The UE SRS transmission manager 715 may be an example of aspects of a UE SRS transmission manager 515, a UE SRS transmission manager 615, or a UE SRS transmission manager 815 described with reference to FIGS. 5, 6, and 8. The UE SRS transmission manager 715 may include covariance matrix component 720, approximate covariance matrix component 725, precoding component 730, and SRS component 735. Each of these modules may communicate, directly or indirectly, with one another (e.g., via one or more buses).

Covariance matrix component 720 may obtain an interference and noise covariance matrix for a set of antennas of a UE and obtain an interference and noise covariance matrix for a set of antennas of a UE. The set of antennas may include a first antenna group and a second antenna group. The first antenna group and the second antenna group may be configured to transmit at different times.

Approximate covariance matrix component 725 may generate an approximated covariance matrix based on the covariance matrix and a number of the antennas of the set of antennas associated with transmit operations at the UE. The number of the antennas associated with transmit operations at the UE may be fewer than a total number of the antennas. Approximate covariance matrix component 725 may select the approximated covariance matrix based on a difference between Eigen directions of the approximated covariance matrix and Eigen directions of the interference and noise covariance matrix. In some cases, the approximated covariance matrix includes a number of sub-matrices. Each sub-matrix may be associated with a number of antennas corresponding to a same transmission time. In some cases, the generated approximated covariance matrix may be based on a DL interference level or a SNR received at each antenna of the set of antennas. In some cases, the approximated covariance matrix is a block diagonal matrix.

Precoding component 730 may precode a SRS using the approximated covariance matrix. Precoding component 730 may also transmit different portions of the precoded SRS at different times. In some cases, precoding component 730 may transmit a message to a base station including an indication of a transmission timing of the different portions of the precoded SRS. Additionally or alternatively, transmit the precoded SRS using the antennas associated with transmit operations.

In some cases, precoding component 730 may precode a SRS for each antenna group using the determined set of precoders, and perform a separate SRS transmission for each determined precoder of each antenna group based on the precoding. In some examples, precoding component 730 may perform a separate SRS transmission for each determined precoder of each antenna group over different tones or at different times. In some examples, precoding component 730 may transmit a message to a base station including an indication of a transmission timing of the separate SRS transmissions for each determined precoder of each antenna group, and determine a set of precoders for each antenna group based on a partitioning of the covariance matrix. In some cases, the message includes a RRC configuration message. In some cases, the message includes a RRC configuration message.

SRS component 735 may perform SRS transmissions associated with one of the antenna groups on even SRS tones, perform SRS transmissions associated with the other of the antenna groups on odd SRS tones, perform SRS transmissions associated with the one of the antenna groups on a first SRS symbol, and perform SRS transmissions associated with the other of the antenna groups on a second SRS symbol. In some cases, the first SRS symbol and the second SRS symbol are adjacent.

Figure 8:
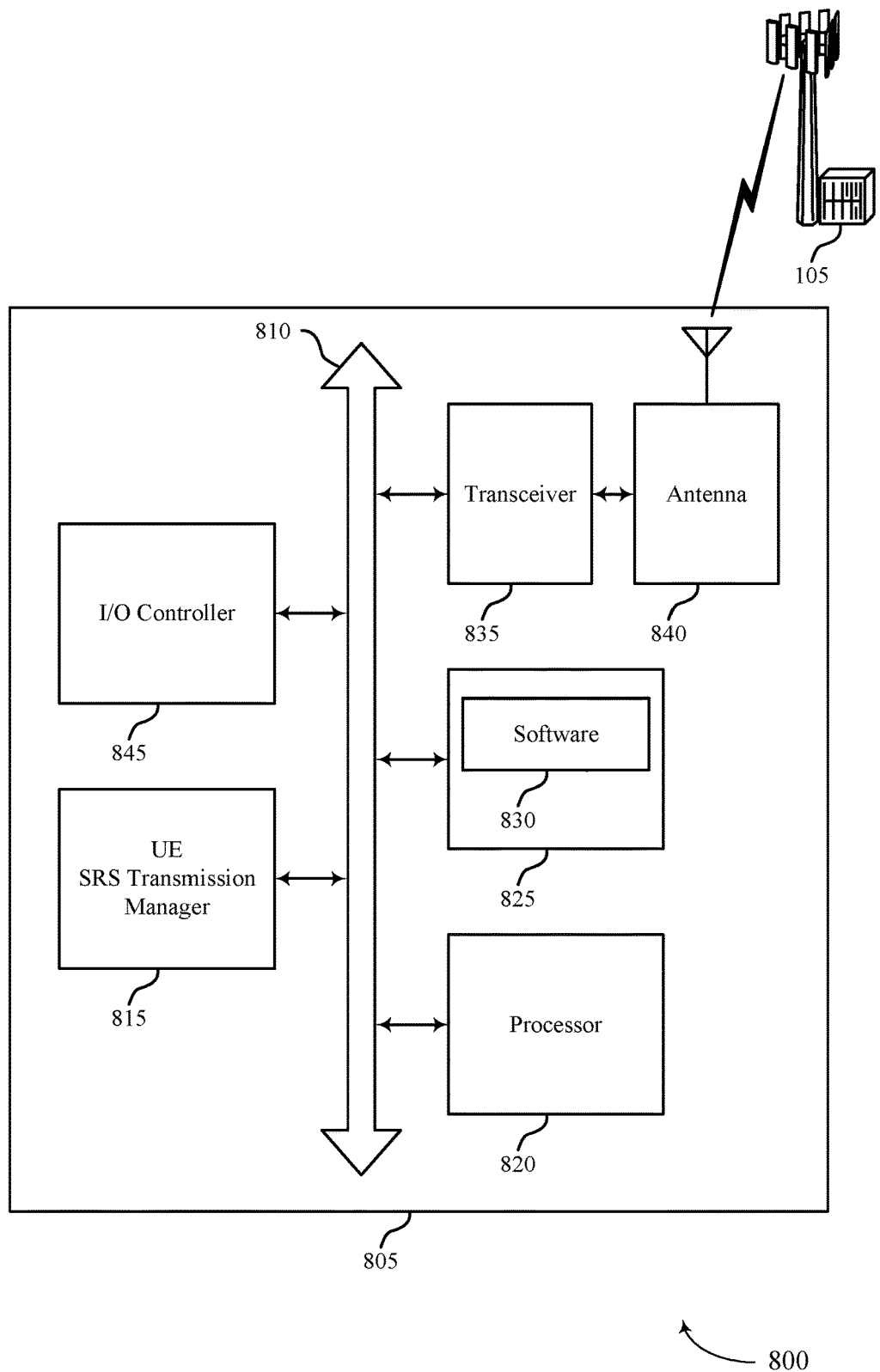
FIG. 8 illustrates a block diagram of a system including a UE that supports precoded SRS transmission with asymmetric transmit and receive antennas in accordance with aspects of the present disclosure.

FIG. 8 shows a diagram of a system 800 including a device 805 that supports precoded SRS transmission with asymmetric transmit and receive antennas in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE SRS transmission manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting precoded SRS transmission with asymmetric transmit and receive antennas).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices. Software 830 may include code to implement aspects of the present disclosure, including code to support precoded SRS transmission with asymmetric transmit and receive antennas. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
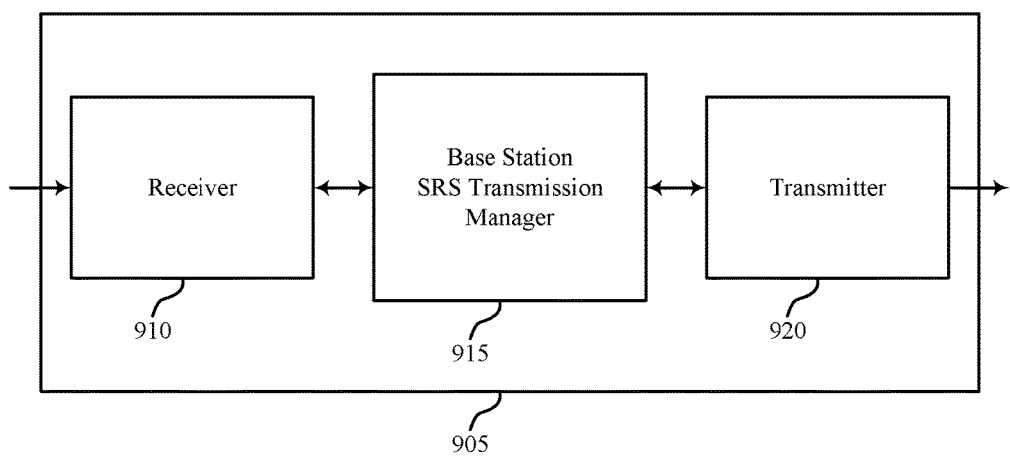
FIGS. 9 through 11 show block diagrams of a base station that supports precoded SRS transmission with asymmetric transmit and receive antennas in accordance with aspects of the present disclosure.

FIG. 9 shows a block diagram 900 of a wireless device 905 that supports precoded SRS transmission with asymmetric transmit and receive antennas in accordance with aspects of the present disclosure. Wireless device 905 may be an example of aspects of a base station 105 as described herein. Wireless device 905 may include receiver 910, base station SRS transmission manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to precoded SRS transmission with asymmetric transmit and receive antennas, etc.). Information may be passed on to other components of the device. The receiver 910 may be an example of aspects of the transceiver 1235 described with reference to FIG. 12. The receiver 910 may utilize a single antenna or a set of antennas.

Base station SRS transmission manager 915 may be an example of aspects of the base station SRS transmission manager 1215 described with reference to FIG. 12. Base station SRS transmission manager 915 and/or at least some of its various sub-components may be implemented in hardware, software executed by a processor, firmware, or any combination thereof. If implemented in software executed by a processor, the functions of the base station SRS transmission manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station SRS transmission manager 915 and/or at least some of its various sub-components may be physically located at various positions, including being distributed such that portions of functions are implemented at different physical locations by one or more physical devices. In some examples, base station SRS transmission manager 915 and/or at least some of its various sub-components may be a separate and distinct component in accordance with various aspects of the present disclosure. In other examples, base station SRS transmission manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station SRS transmission manager 915 may receive a precoded SRS during an UL transmission from a UE and determine a SNR or interference level, or both based on the set of precoded SRS.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
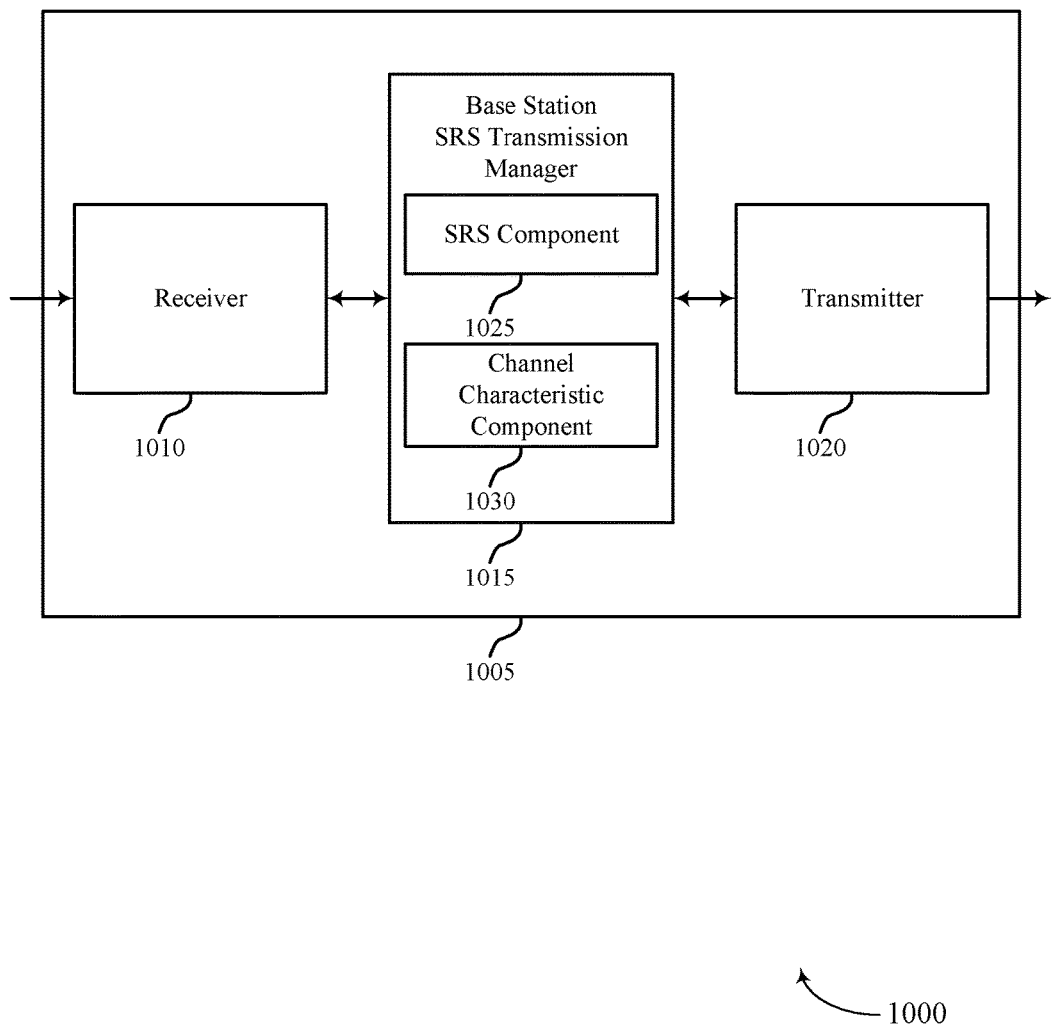

FIG. 10 shows a block diagram 1000 of a wireless device 1005 that supports precoded SRS transmission with asymmetric transmit and receive antennas in accordance with aspects of the present disclosure. Wireless device 1005 may be an example of aspects of a wireless device 905 or a base station 105 as described with reference to FIG. 9. Wireless device 1005 may include receiver 1010, base station SRS transmission manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to precoded SRS transmission with asymmetric transmit and receive antennas, etc.). Information may be passed on to other components of the device. The receiver 1010 may be an example of aspects of the transceiver 1235 described with reference to FIG. 12. The receiver 1010 may utilize a single antenna or a set of antennas.

Base station SRS transmission manager 1015 may be an example of aspects of the base station SRS transmission manager 1215 described with reference to FIG. 12. Base station SRS transmission manager 1015 may also include SRS component 1025 and channel characteristic component 1030. SRS component 1025 may receive a precoded SRS during an UL transmission from a UE and receive different portions of the precoded SRS at different times. In some cases, the base station is a serving cell. In some cases, the base station is a neighboring cell. Channel characteristic component 1030 may determine a SNR or interference level, or both based on the set of precoded SRS.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
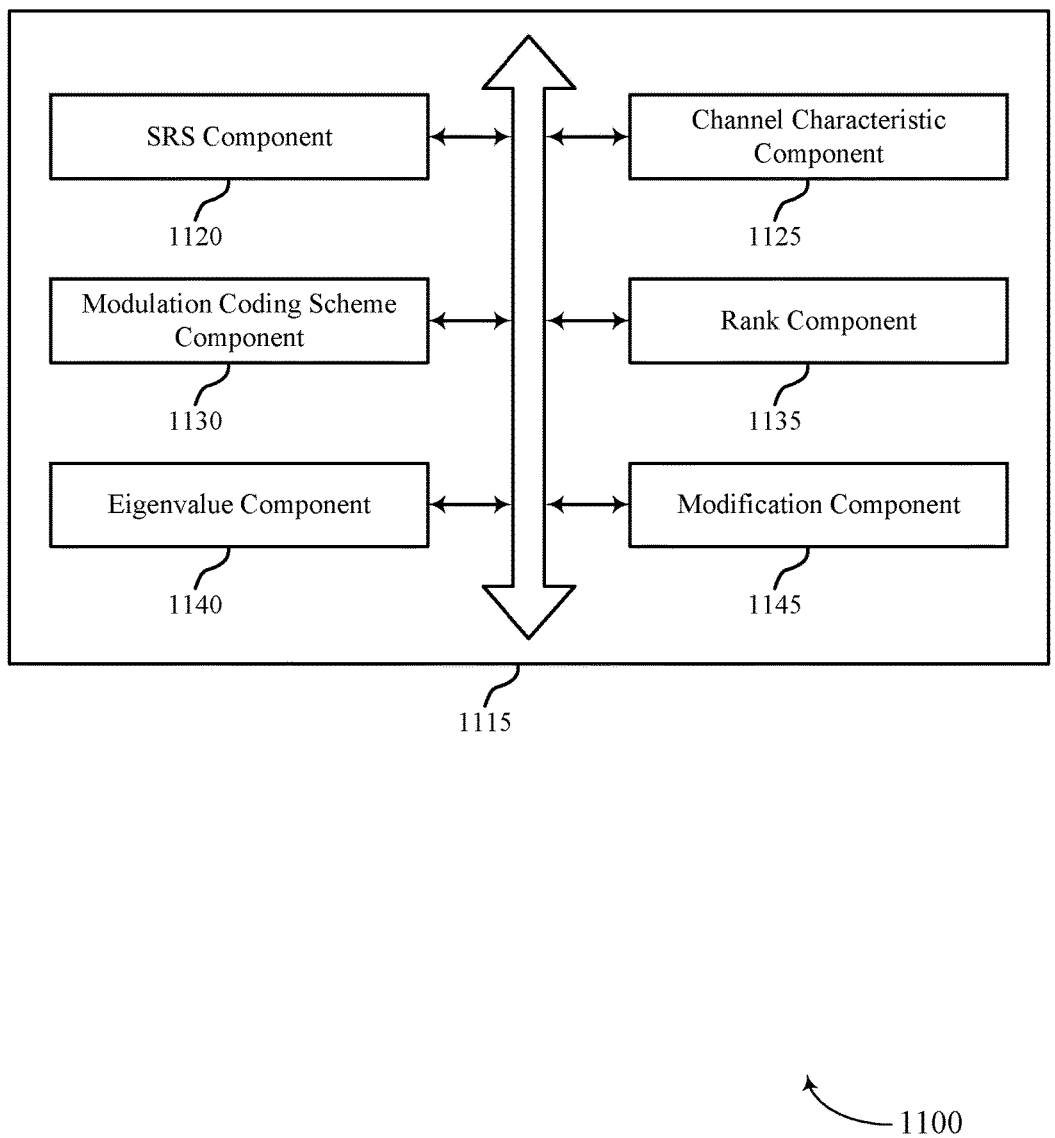

FIG. 11 shows a block diagram 1100 of a base station SRS transmission manager 1115 that supports precoded SRS transmission with asymmetric transmit and receive antennas in accordance with aspects of the present disclosure. The base station SRS transmission manager 1115 may be an example of aspects of a base station SRS transmission manager 1215 described with reference to FIGS. 9, 10, and 12. The base station SRS transmission manager 1115 may include SRS component 1120, channel characteristic component 1125, modulation coding scheme component 1130, rank component 1135, eigenvalue component 1140, and modification component 1145. Each of these modules may communicate, directly or indirectly, with one another (e.g., via one or more buses).

SRS component 1120 may receive a precoded SRS during an UL transmission from a UE and receive different portions of the precoded SRS at different times. In some cases, the base station is a serving cell. In some cases, the base station is a neighboring cell. Channel characteristic component 1125 may determine a SNR or interference level, or both based on the set of precoded SRS. Modulation coding scheme component 1130 may determine a MCS for a UE based on the precoded SRS.

Rank component 1135 may identify a rank of a channel matrix associated with the precoded SRS and determine a number of simultaneous transmission opportunities for transmission of data streams to the UE based on the rank. Eigenvalue component 1140 may identify eigenvalues of the precoded SRS and compare the eigenvalues to a threshold value based on the identifying. Modification component 1145 may modify a transmission power based on the eigenvalues satisfying the threshold value and modify a transmission rank based on the eigenvalues satisfying the threshold value.

Figure 12:
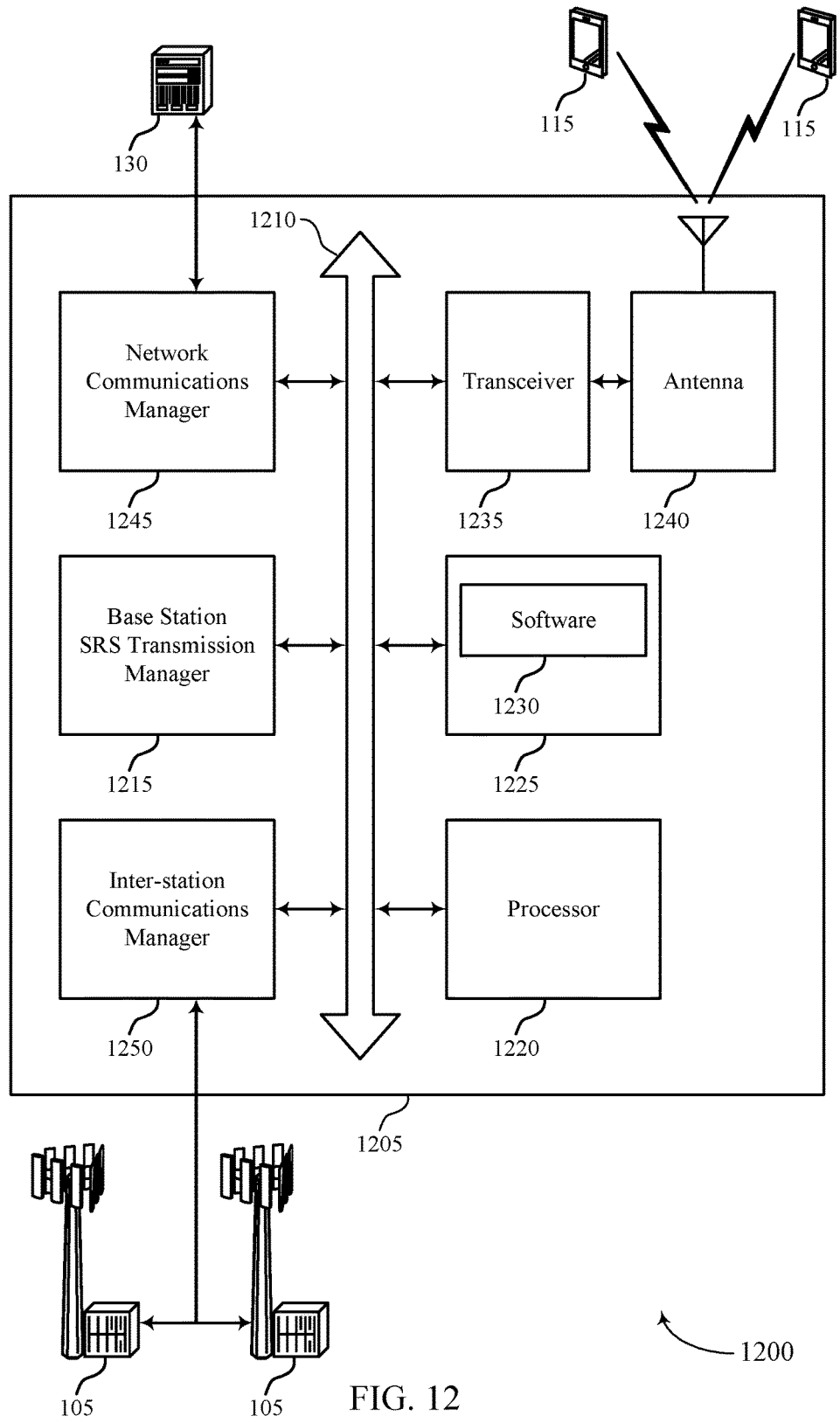
FIG. 12 illustrates a block diagram of a system including a base station that supports precoded SRS transmission with asymmetric transmit and receive antennas in accordance with aspects of the present disclosure.

FIG. 12 shows a diagram of a system 1200 including a device 1205 that supports precoded SRS transmission with asymmetric transmit and receive antennas in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station SRS transmission manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting precoded SRS transmission with asymmetric transmit and receive antennas).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices. Software 1230 may include code to implement aspects of the present disclosure, including code to support precoded SRS transmission with asymmetric transmit and receive antennas. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions. Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
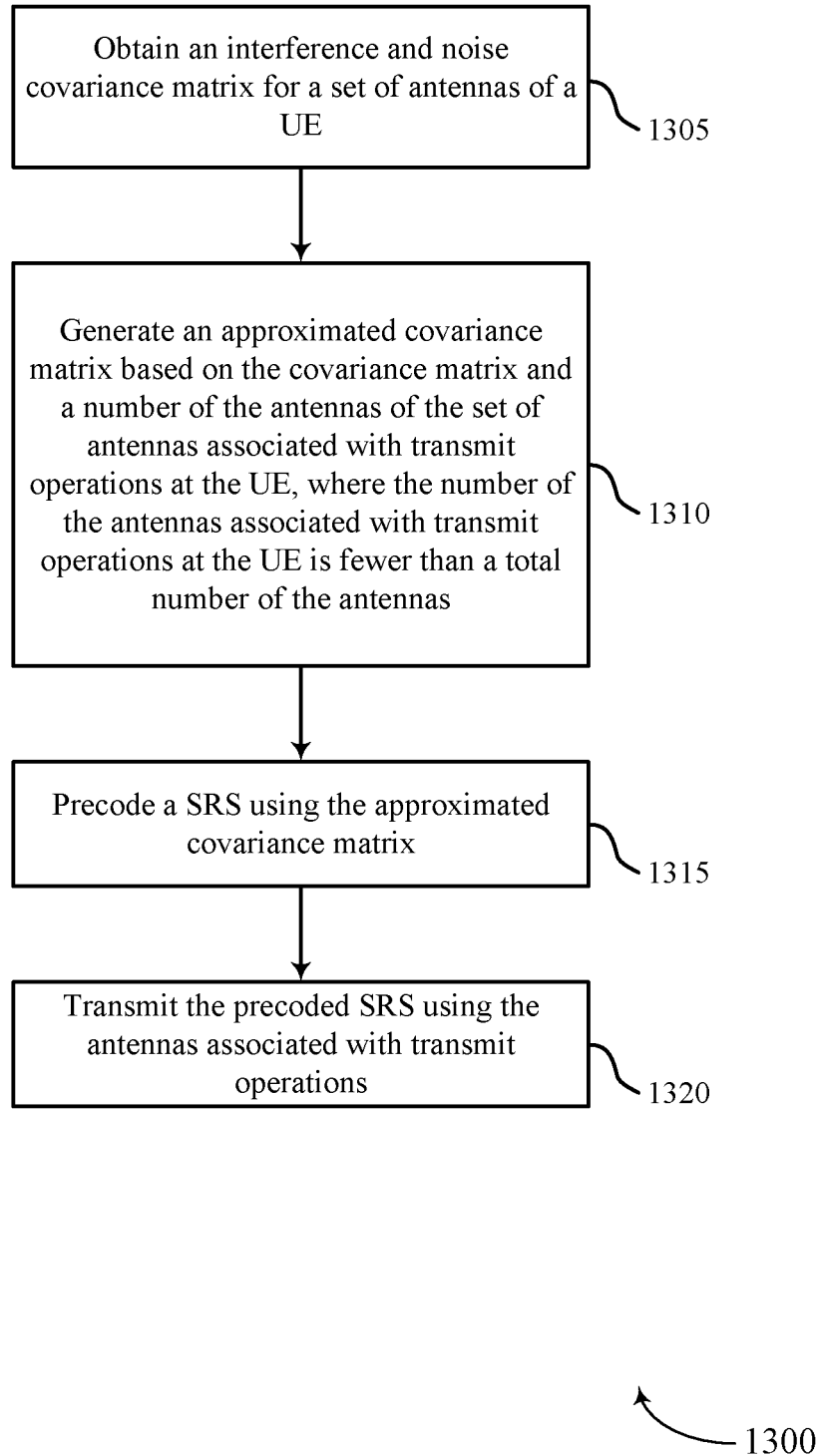
FIGS. 13 and 14 illustrate methods for precoded SRS transmission with asymmetric transmit and receive antennas in accordance with aspects of the present disclosure.

FIG. 13 shows a flowchart illustrating a method 1300 for precoded SRS transmission with asymmetric transmit and receive antennas in accordance with aspects of the present disclosure. The operations of method 1300 may be implemented by a UE 115 or its components as described herein. For example, the operations of method 1300 may be performed by a UE SRS transmission manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may obtain an interference and noise covariance matrix for a plurality of antennas of UE 115. The operations of block 1305 may be performed according to the methods described herein. In some examples, aspects of the operations of block 1305 may be performed by a covariance matrix component as described with reference to FIGS. 5 through 8.

At block 1310 the UE 115 may generate an approximated covariance matrix based at least in part on the covariance matrix and a number of the antennas of the plurality of antennas associated with transmit operations at the UE 115. The number of the antennas associated with transmit operations at the UE 115 may be fewer than a total number of the antennas. The operations of block 1310 may be performed according to the methods described herein. In some examples, aspects of the operations of block 1310 may be performed by an approximate covariance matrix component as described with reference to FIGS. 5 through 8.

At block 1315 the UE 115 may precode a SRS using the approximated covariance matrix. The operations of block 1315 may be performed according to the methods described herein. In some examples, aspects of the operations of block 1315 may be performed by a precoding component as described with reference to FIGS. 5 through 8.

At block 1320 the UE 115 may transmit the precoded SRS using the antennas associated with transmit operations. The operations of block 1320 may be performed according to the methods described herein. In some examples, aspects of the operations of block 1320 may be performed by a precoding component as described with reference to FIGS. 5 through 8.

Figure 14:
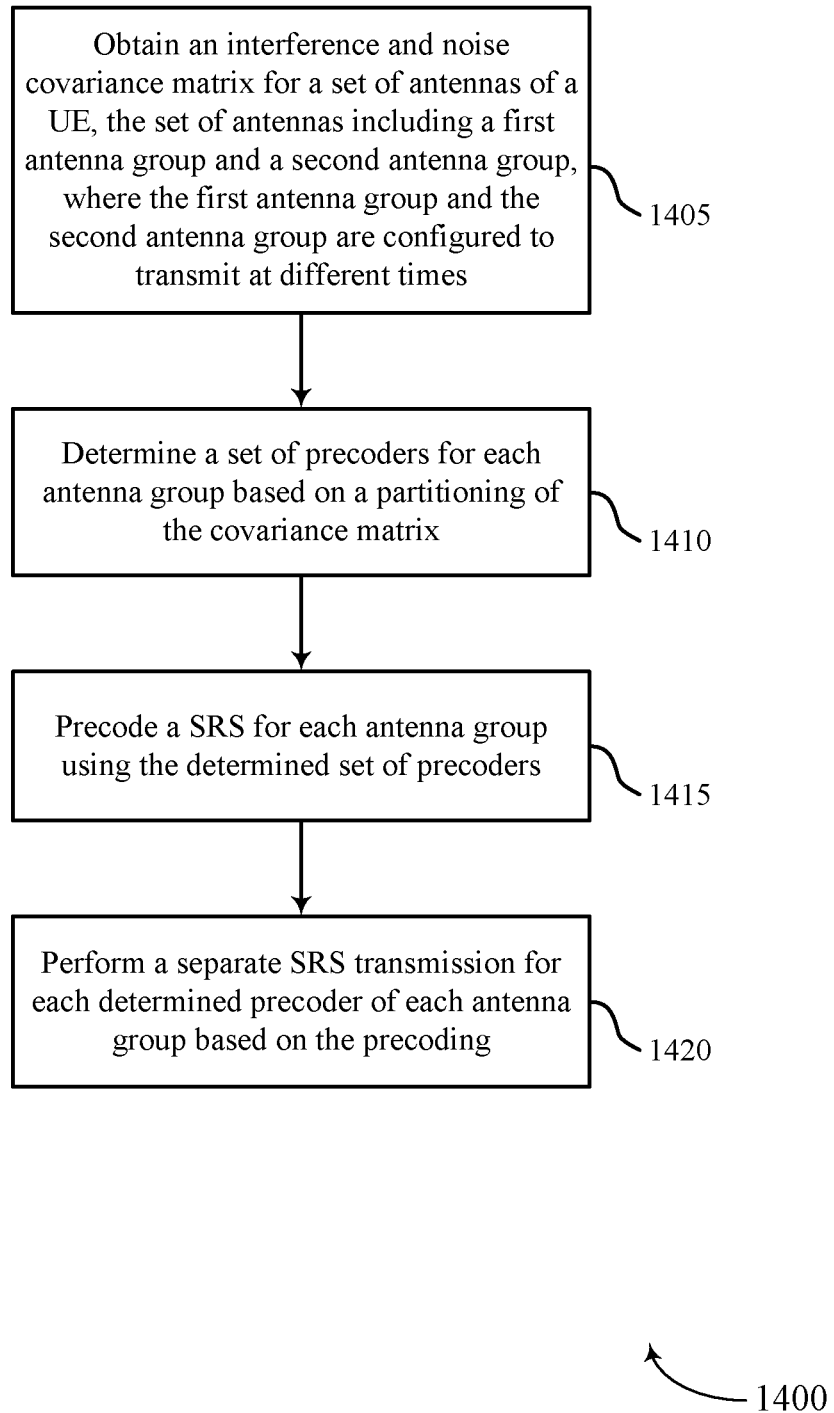

FIG. 14 shows a flowchart illustrating a method 1400 for precoded SRS transmission with asymmetric transmit and receive antennas in accordance with aspects of the present disclosure. The operations of method 1400 may be implemented by a UE 115 or its components as described herein. For example, the operations of method 1400 may be performed by a UE SRS transmission manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may obtain an interference and noise covariance matrix for a plurality of antennas of UE 115. The plurality of antennas may include a first antenna group and a second antenna group. In some examples, the first antenna group and the second antenna group may be configured to transmit at different times. The operations of block 1405 may be performed according to the methods described herein. In some examples, aspects of the operations of block 1405 may be performed by a covariance matrix component as described with reference to FIGS. 5 through 8.

At block 1410 the UE 115 may determine a plurality of precoders for each antenna group based at least in part on a partitioning of the covariance matrix. The operations of block 1410 may be performed according to the methods described herein. In some examples, aspects of the operations of block 1410 may be performed by a precoding component as described with reference to FIGS. 5 through 8.

At block 1415 the UE 115 may precode a SRS for each antenna group using the determined plurality of precoders. The operations of block 1415 may be performed according to the methods described herein. In some examples, aspects of the operations of block 1415 may be performed by a precoding component as described with reference to FIGS. 5 through 8.

At block 1420 the UE 115 may perform a separate SRS transmission for each determined precoder of each antenna group based at least in part on the precoding. The operations of block 1420 may be performed according to the methods described herein. In some examples, aspects of the operations of block 1420 may be performed by a precoding component as described with reference to FIGS. 5 through 8.

It should be noted that the methods described above describe possible examples, and that the operations and the steps may be rearranged or otherwise modified and that other examples are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   obtaining an interference and noise covariance matrix for a plurality of antennas of a user equipment (UE), the plurality of antennas comprising a first antenna group and a second antenna group, wherein the first antenna group and the second antenna group are configured to transmit at different times;
   determining a first precoder for the first antenna group and a second precoder for the second antenna group based at least in part on a partitioning of the interference and noise covariance matrix;
   precoding a sounding reference signal (SRS) for the first antenna group using the first precoder and for the second antenna group using the second precoder; and
   performing a first SRS transmission for the first antenna group using the first precoder and a second SRS transmission for the second antenna group using the second precoder.

2. The method of claim 1, further comprising:
   performing the first SRS transmission for the first antenna group using the first precoder and the second SRS transmission with the second antenna group using the second precoder over different tones or at different times.

3. The method of claim 2, further comprising:
   transmitting a message to a base station comprising an indication of a transmission timing of the first SRS transmission for the first antenna group using the first precoder and the second SRS transmission with the second antenna group using the second precoder.

4. The method of claim 3, wherein the message comprises a radio resource control (RRC) configuration message.

5. The method of claim 1, further comprising:
   performing a first set of SRS transmissions associated with one of the first antenna group using the first precoder or the second antenna group using the second precoder on even SRS tones; and
   performing a second set of SRS transmissions associated with the other of the first antenna group using the first precoder or the second antenna group using the second precoder on odd SRS tones.

6. The method of claim 1, further comprising:
   performing a first set of SRS transmissions associated with the one of the first antenna group using the first precoder or the second antenna group using the second precoder on a first SRS symbol; and
   performing a second set of SRS transmissions associated with the other of the first antenna group using the first precoder or the second antenna group using the second precoder on a second SRS symbol.

7. The method of claim 6, wherein the first SRS symbol and the second SRS symbol are adjacent.

8. A method for wireless communication, comprising:
   obtaining an interference and noise covariance matrix for a plurality of antennas of a user equipment (UE);
   generating an approximated covariance matrix based at least in part on the interference and noise covariance matrix and a number of the antennas of the plurality of antennas associated with transmit operations at the UE, wherein the number of the antennas associated with transmit operations at the UE is fewer than a total number of the antennas;
   precoding a sounding reference signal (SRS) using the approximated covariance matrix; and
   transmitting the precoded SRS using the antennas associated with transmit operations.

9. The method of claim 8, wherein the approximated covariance matrix comprises a number of sub-matrices, wherein each sub-matrix is associated with a number of antennas corresponding to a same transmission time.

10. The method of claim 8, further comprising:
    transmitting different portions of the precoded SRS at different times.

11. The method of claim 10, further comprising:
    transmitting a message to a base station comprising an indication of a transmission timing of the different portions of the precoded SRS.

12. The method of claim 11, wherein the message comprises a radio resource control (RRC) configuration message.

13. The method of claim 8, wherein the generated approximated covariance matrix is based at least in part on a downlink (DL) interference level or a signal-to-noise ratio (SNR) received at each antenna of the plurality of antennas.

14. The method of claim 8, wherein the approximated covariance matrix is a block diagonal matrix.

15. The method of claim 8, further comprising:
    selecting the approximated covariance matrix based at least in part on a difference between Eigen directions of the approximated covariance matrix and Eigen directions of the interference and noise covariance matrix.

16. An apparatus for wireless communication, comprising:
    a processor;
    memory in electronic communication with the processor; and
    instructions stored in the memory, wherein the instructions are executable by the processor to:
    obtain an interference and noise covariance matrix for a plurality of antennas of the apparatus the plurality of antennas comprising a first antenna group and a second antenna group, wherein the first antenna group and the second antenna group are configured to transmit at different times;

determine a first precoder for the first antenna group and a second precoder for the second antenna group based at least in part on a partitioning of the interference and noise covariance matrix;

precode a sounding reference signal (SRS) for the first antenna group using the first precoder and for the second antenna group using the second precoder; and perform a first SRS transmission for the first antenna group using the first precoder and a second SRS transmission for the second antenna group using the second precoder.

17. The apparatus of claim 16, wherein the instructions are executable by the processor to:

perform the first SRS transmission for the first antenna group using the first precoder and the second SRS transmission with the second antenna group using the second precoder over different tones or at different times.

18. The apparatus of claim 17, wherein the instructions are executable by the processor to:

transmit a message to a base station comprising an indication of a transmission timing of the first SRS transmission for the first antenna group using the first precoder and the second SRS transmission with the second antenna group using the second precoder.

19. The apparatus of claim 18, wherein the message comprises a radio resource control (RRC) configuration message.

20. The apparatus of claim 16, wherein the instructions are executable by the processor to:

perform a first set of SRS transmissions associated with one of the first antenna group using the first precoder or the second antenna group using the second precoder on even SRS tones; and perform a second set of SRS transmissions associated with the other of the first antenna group using the first precoder or the second antenna group using the second precoder on odd SRS tones.

21. The apparatus of claim 16, wherein the instructions are executable by the processor to:

perform a first set of SRS transmissions associated with the one of the first antenna group using the first precoder or the second antenna group using the second precoder on a first SRS symbol; and perform a second set of SRS transmissions associated with the other of the first antenna group using the first precoder or the second antenna group using the second precoder on a second SRS symbol.

22. The apparatus of claim 21, wherein the first SRS symbol and the second SRS symbol are adjacent.

23. An apparatus for wireless communication, comprising:

a processor;

memory in electronic communication with the processor; and instructions stored in the memory, wherein the instructions are executable by the processor to:

obtain an interference and noise covariance matrix for a plurality of antennas of the apparatus;

generate an approximated covariance matrix based at least in part on the interference and noise covariance matrix and a number of the antennas of the plurality of antennas associated with transmit operations at the apparatus, wherein the number of the antennas associated with transmit operations at the apparatus is fewer than a total number of the antennas;

precode a sounding reference signal (SRS) using the approximated covariance matrix; and transmit the precoded SRS using the antennas associated with transmit operations.

24. The apparatus of claim 23, wherein the approximated covariance matrix comprises a number of sub-matrices, wherein each sub-matrix is associated with a number of antennas corresponding to a same transmission time.

25. The apparatus of claim 23, wherein the instructions are executable by the processor to:

transmit different portions of the precoded SRS at different times.

26. The apparatus of claim 25, wherein the instructions are executable by the processor to:

transmit a message to a base station comprising an indication of a transmission timing of the different portions of the precoded SRS.

27. The apparatus of claim 26, wherein the message comprises a radio resource control (RRC) configuration message.

28. The apparatus of claim 23, wherein the generated approximated covariance matrix is based at least in part on a downlink (DL) interference level or a signal-to-noise ratio (SNR) received at each antenna of the plurality of antennas.

29. The apparatus of claim 23, wherein the approximated covariance matrix is a block diagonal matrix.

30. The apparatus of claim 23, wherein the instructions are executable by the processor to:

select the approximated covariance matrix based at least in part on a difference between Eigen directions of the approximated covariance matrix and Eigen directions of the interference and noise covariance matrix.

* * * * *